United States Patent [19]

Kelly

[11] Patent Number: 4,876,550

[45] Date of Patent: Oct. 24, 1989

[54] RIDGE REGRESSION SIGNAL PROCESSING FOR POSITION-FIX NAVIGATION SYSTEMS

[75] Inventor: Robert J. Kelly, Baltimore, Md.

[73] Assignee: Allied-Signal Inc., Morris Township, Mooris County, N.J.

[21] Appl. No.: 107,430

[22] Filed: Oct. 8, 1987

[51] Int. Cl.$^4$ .............................................. G01S 3/02
[52] U.S. Cl. .................................. 342/451; 342/450; 342/461
[58] Field of Search ....................... 342/461, 450, 451; 364/443, 446, 449

[56] References Cited

U.S. PATENT DOCUMENTS

| | | | |
|---|---|---|---|
| 3,881,096 | 4/1975 | Schmidt | 342/450 |
| 3,941,984 | 3/1976 | Chappell et al. | 342/461 |
| 4,433,334 | 2/1984 | Caputi, Jr. | 342/450 |
| 4,433,335 | 2/1984 | Wind | 342/463 |

OTHER PUBLICATIONS

Hoerl, A., Kennard, R. (1970) "Ridge Regression & Bias Estimation for Nonorthogonal Problems" Technometrics, vol. 12, #1 Feb. 1970.
Milliken, R. J., Zoller, C. J. (1978), "Principles of Operation of NAVSTAR and System Characteristics" Journal of the Institute of Navigation, vol. 25, No. 2, Summer 1978.
Fried, W. R., (1978), "Principles and Simulation of JTIDS Relative Navigation" IEEE Trans Aerospace and Electronic Systems, vol. AES-14, M1, Jan. 1978.
Poivot, J. L. McWilliams, G. V., (1974), "Application of Linear Statistical Models to Radar Location Techniques" IEEE Transactions on Aerospace & Electronic Systems, vol. AES-10, #6, Nov. 1974.
Wax, M., (1983), "Position Location from Sensors with Position Uncertainty", IEEE Trans on Aerospace and Electronics Systems, vol. AES-19, #5, Sep. 1983.
Theobold, C. M., (1974), "Generalization of Mean Square Error Applied to Ridge. Regression", J. Royal Statistician Soc. Ser. B, vol. 36, 1974.
Efron, B. (1975), Biased versus unbiased estimation, *Advances in Math,* 16, 1975.
Springarn, R., Weidemann, H. L., (1972), "Linear Regression Filtering and Prediction for Tracking Maneuvering Aircraft Targets", IEEE Trans on Aerospace and Electric Systems, vol. AES #6, Nov. 1972.
Foy, W. (1976), "Position–Location Solutions by Taylor–Series Estimation," IEEE Transactions on Aerospace & Electronic Systems; vol. AES-12, No. 2, Mar. 1976.
Friedland, B. (1973), "Optimum Steady-State Position and Velocity Estimation Using Noisy Sampled Position Data," IEEE Transactions on Aerospace and Electronic Systems, vol. AES 9 #6, Nov. 1973.
Torrieri, D. (1984), "Statistical Theory of Passive Location Systems" IEEE Trans on Aerospace and Electronic Systems, vol. AES-20, #2, Mar., 1984.
Marquardt, D. (1970) Generalized Inverses, Ridge Regression, Biased Linear Estimation and Non Linear Estimation, Technometrics, vol. 12, 1970.

Primary Examiner—Thomas H. Tarcza
Assistant Examiner—David Cain
Attorney, Agent, or Firm—Howard G. Massung

[57] ABSTRACT

A position estimator for determining the position and velocity of a moving platform in cooperation with radio navigation aids is described incorporating an unbiased estimator, such as a least means square estimator, a biased estimator for determining the angle of inner section of the lines of position from the radio naviation aids for determining the liklihood of geometric dilution of precision (GDOP) and a switch for selecting the estimate of position and velocity from said biased estimator at first times and the unbiased estimator at second times. The invention overcomes the problem of accuracy degredation associated with a nearly collinear measurement geometry which causes the variance of the position estimates to be highly inflated.

13 Claims, 10 Drawing Sheets (PRIOR ART)

RIDGE REGRESSION SIGNAL PROCESSING FOR POSITION-FIX NAVIGATION SYSTEMS

BACKGROUND OF THE INVENTION

1. Field of the Invention:

This invention relates to position-fix navigation systems and more particularly to calculating target position and velocity from sensor information with reduced mathematical variance at times the sensors are nearly collinear with the target, a condition known as the geometric dilution of precision (GDOP).

2. Description of the Prior Art:

All position-location navigation schemes can be classified as dead reckoning position-fix or combinations of both. A position, once known, can be carried forward indefinitely by keeping continuous account of the velocity of the vehicle, ship or aircraft. This process is called dead reckoning.

A position-fix navigation system, in contrast to dead reckoning, determines the position of a vehicle, ship or aircraft without reference to any former position. The simplest position fix stems from the observation of a recognizable landmark. More frequently, however, radio aids to navigation provide position information where the physical locations of the radio aids, the ground station transmitters, are known. At present, most aircraft in the world use distance measuring equipment (DME) and very high frequency omnirange (VOR) which provide position-fix information and wherein the physical location of the DME or VOR are known. Other position-fix systems are LORAN-C and Omega as well as the recently developed position-fix systems such as the Global Positioning System (GPS) and the Relative Navigation Component of the Joint Tactical Information Distribution System (JTIDS).

The aircraft position-fixing is traditionally accomplished by determining the intersection of two or more lines of position (LOP) with respect to some known reference system. These LOP's represent the intersection of three-dimensional surfaces of position with the earth's surface which in many practical cases is approximated locally by a plane. Thus, on the earth's surface, the LOP or a range measurement is a circle while an angle (bearing) measurement is a line. A position-fix is the intersection of two LOP's which require at least two measurements. Since no measurement can be made without error, the LOP's will have an error associated therewith and thus the intersection of two LOP's will generate a position error.

The position error may be substantially increased at times the LOP's are nearly collinear (i.e. not orthogonal). This position error mechanism is known as the geometric dilution of precision (GDOP). One example where the LOP's are nearly collinear is when an aircraft is between two landmarks along a line between the landmarks or when the aircraft is outside both landmarks along a line between both landmarks. Another example of GDOP is when the aircraft distance from two landmarks is great compared to the distance between the two landmarks. Position error due to GDOP begins to occur when the angle $\gamma$ between the intersection of two LOP's is greater that 150° or less than 30°.

Virtually all aircraft position-fix algorithms use some form of unbiased Least Mean Squared Estimation (LMS). The position of the aircraft is expressed as a plurality of linear equations which are then solved for the unknown values of position in coordinates (X and Y) and velocity having components $V_x$ and $V_y$. The linear equations may be expressed in the form $$\underline{Y} = X\underline{\beta} + \underline{e} \qquad (1)$$

where Y is the nxl observation vector, X is an nxp prediction matrix and e is the nxl error vector with covariance matrix, W. The statistical problem is how to best guess the component values of the pxl regressor vector $\beta$. As is well known, one method is the ordinary LMS solution which assumes the covariance matrix W as given in Equation (4). It is given in Equation 2, $$\underline{\hat{\beta}}_{OLS} = (X^T X)^{-1} X^T \underline{Y} \qquad (2)$$

which follows from the so called "normal" equations, shown in Equation 3, $$X^T X \underline{\hat{\beta}}_{OLS} = X^T \underline{Y} \qquad (3)$$

Equation (3) assumes that $$W = \sigma^2 I \qquad (4)$$

where $\sigma^2$ is the variance (i.e. $\sigma$ is the standard deviation) and I is the nxn identity matrix. When $$W = \begin{bmatrix} \sigma_{11}^2 & \sigma_{1n}^2 \\ \sigma_{n1}^2 & \sigma_{nn}^2 \end{bmatrix} \qquad (4.1)$$

the LMS solution $\underline{\hat{\beta}}_{GEN}$ is called Generalized least square where $$\underline{\hat{\beta}}_{GEN} = (X^T W^{-1} X)^{-1} X^T W^{-1} \underline{Y} \qquad (4.2)$$

A most critical performance measure is the variance of the estimate; it is given by $$VAR(\underline{\hat{\beta}}_{OLS}) = (X^T X)^{-1} \sigma^2 \qquad (4.3)$$

for the OLS estimate.

When GDOP exists, the sensor errors i.e. receiver noise, quantization noise, propagation effects, etc. can be "blown up" or "blown down" when the sensor measurements are referenced to the navigation coordinates to determine an aircraft position fix. This inflation of the position estimate errors (GDOP) arises mathematically from the $X^T X$ term in Equation 4.3. It may have values which are very small or values which are equal to zero in the diagonal terms of the matrix. These unusually small or zero values "blow up" to be very large values when the inverse of $X^T X$ (i.e. $(X^T X)^{-1}$ is calculated as indicated in Equation 4.3. The meaning of Equation 4.3 is that on the average the very large values in the matrix $(X^T X)^{-1}$ inlate the values of the ordinary LMS solution $\underline{\beta}$ when Equation 2 is solved.

Present navigation systems on aircraft accept the position estimates, some of which are highly inflated.

Mathematically, a plurality of linear equations may be solved wherein the relationship $X^T X$ is used where $X^T$ is the transpose of the matrix X and where $X^T X$ is a matrix having eigenvalues $\lambda$. When the relationship $X^T X$ moves from a unit matrix to one where high multicollinearity exists, variance inflation will rise as the smallest eigenvalue $\lambda s$ approaches zero. A mathematical technique which counteracts the effects of multicollinearity was disclosed in a publication by J. Riley wherein the diagonal terms of the $X^TX$ matrix were limited to certain minimum values. This technique avoided numerical difficulties when inverting a square matrix. The publication by J. Riley is entitled "Solving Systems of Linear Equations—With a Positive Definite, Symetric But Possibly Ill-conditioned Matrix," Mathematic Tables and Other Aids to Compute., Vol. 9, 1955. In a further development, a paper was published by A. Hoerl and R. Kennard entitled "Optimum Solution of Many Variable Equations" Chemical Engineering Progress, Vol. 55, No. 11, November 1959. Two additional papers were published by A. Hoerl and R. Kennard entitled "Ridge Regression and Bias Estimation for Nonorthogonal Problems", Technometrics, Vol. 12, No. 1, February 1970 and "Ridge Regression: Applications to Nonorthogonal Problems", Technometrics, Vol. 12, No. 1, February 1970. The authors described a technique termed "Ridge Regression" which counteracts the effects of multicollinearity. In Ridge Regression, the diagonal components of a matrix are limited to a predetermined value by adding a small term K to each diagonal component. That is $X^TX$ is transformed into $X^TX + KI$ where I is the unit matrix. The idea in Ridge Regression is to find an estimator whose variance decreases as $[X^TX + KI]^{-1}$; which means that the variance inflation is limited to 1/K even when the eigenvalues of $X^TX \to 0$. Equation 5 shows the expression for the Ridge Regression coefficients $\beta_R$.

$$\hat{\beta}_R = [X^TX + KI]^{-1} X^T \underline{Y} \tag{5}$$

In the literature, K is known as the Ridge parameter.

SUMMARY OF THE INVENTION

An apparatus and method is described for determining the position and velocity of a moving platform comprising a radio navigation aid having at least three portions, two of which are distant from the platform and having a known position for providing to the platform a plurality of samples indicative of the position of the platform at respective times, a position estimator for receiving the plurality of samples for generating an estimate of position and velocity, both with an unbiased estimator and with a biased estimator and selecting the estimate of position and velocity from the biased estimator at times the geometry of the moving platform is substantially collinear with the two distant portions of the radio navigation aid.

It is an object of this invention to provide a position estimator which utilizes a biased estimator based upon Ridge Regression at times the geometry of the navigation landmarks are nearly collinear.

It is a further object of this invention to provide a position estimator utilizing a least mean square estimator at first times and a Ridge Regression estimator at second times when the geometric dilution of precision (GDOP) is present.

It is a further object of this invention to provide a position estimator suitable for functioning in the guidance loop in the navigation system of an aircraft, for example, wherein position samples are provided by a position-fix navigation system such as a distance measuring equipment (DME), global positioning system (GPS), very high frequency omnirange (VOR) etc. and wherein a Ridge Regression algorithm is used at times GDOP is present.

DESCRIPTION OF THE PREFERRED EMBODIMENT

Figure 1:
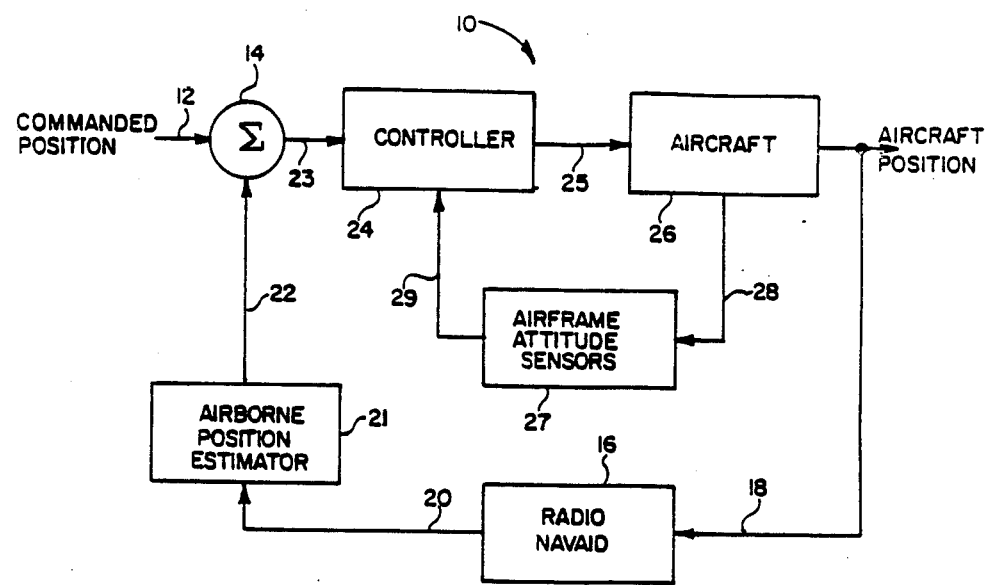
FIG. 1 is a block diagram of a typical navigation system for an aircraft.

Referring to FIG. 1, a typical navigation system 10 of an aircraft 26 is shown. A commanded position for a desired flight path position is coupled over lead 12 to an input of adder 14. The position of aircraft 26 is sensed by radio navigation aids such as distance measuring equipment (DME) or very high frequency omnirange (VOR). Radio navaid 16 has an input from aircraft 26 over lead 18 indicative of aircraft position and an output over lead 20 which may provide a plurality of samples indicative of the position of aircraft 26 at respective times. Lead 20 is coupled to an input of airborne position estimator 21 which functions to receive the plurality of samples indicative of the position of aircraft 26 at respective times and to generate an estimate of position and velocity of the aircraft. Airborne position estimator 21 typically is a least mean square (LMS) estimator. The output of airborne position estimator is coupled over lead 22 to a second input of adder 14. Adder 14 functions to combine mathematically the commanded position on lead 12 with the estimated position on lead 22 to provide a steering command or error signal over lead 23 to an input of controller 24. Controller 24 may be, for example, an autopilot or human pilot which couples a correction signal to the aircraft. The correction signal is maintained near its null position by changing the direction of the aircraft's velocity vector by controlling the attitude of the aircraft. Inducing a roll angle command causes the aircraft to turn left or right from its flight path. Similarly, a change in its pitch angle causes the aircraft to fly above or below its intended flight path. The correction signal is coupled over lead 25 to aircraft 26. The attitude of aircraft 26 is sensed by airframe attitude sensors 27 which may have an input over lead 28 from aircraft 26. The output of airframe attitude sensors 27 are coupled over lead 29 to a second input of controller 24.

In FIG. 1, the control loop shown by leads 28 and 29 provide feedback to controller 24 and is commonly known as the flight control system loop. The outer loop shown by leads 18, 20 and 22 provide feedback information to adder 14 as to the position of the aircraft and is commonly known as the guidance control loop. The output of airborne position estimator 21 on lead 22 is dependent upon the performance of radio navaid 16 and airborne position estimator 21. As determined by the desired flight path or track over the earth's surface and the position of other distant portions of radio navaid 16 which may have transmitter locations on the earth's surface, the performance of radio navaid 16 may be degraded due to collinearity of the distant portions of radio navaid 16 and aircraft 26. For example, radio navaid 16 may provide two lines of position (LOP) from two transmitters having respective locations on the earth's surface. The LOPs may intersect at either a large angle greater than 150° or at a small angle less that 30° which results in nearly collinear measurement geometry termed the general dilution of precision (GDOP). The degraded performance from radio navaid 16 on line 20 is processed by airborne position estimator 21 to provide degraded position information on lead 22 at times collinear measurement geometry or GDOP is present. The degraded position information on lead 22 results in degraded steering commands on lead 23 to controller 24 causing controller 24 to vary the velocity vector of aircraft 26 away from the desired flight path at times GDOP is present.

Figure 2:
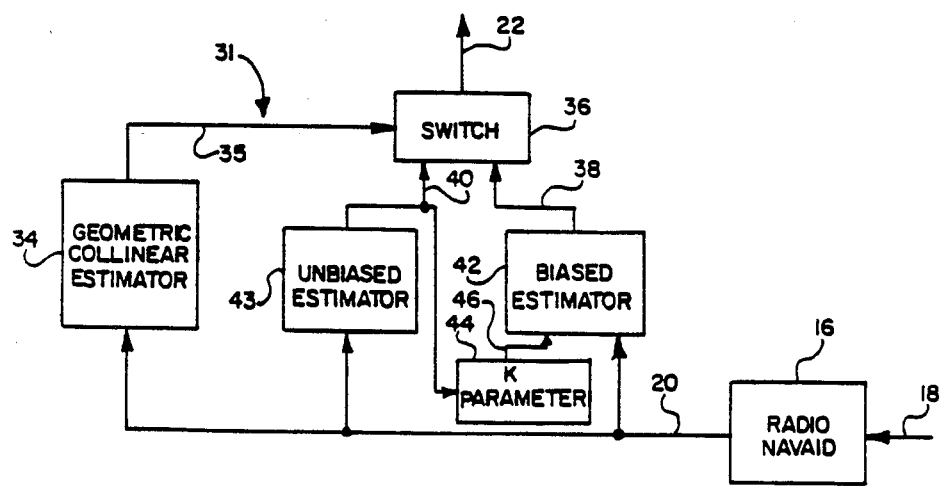
FIG. 2 is a block diagram of one embodiment of the invention.

Referring to FIG. 2, a block diagram of position estimator 31 is shown suitable for use in place of airborne position estimator 21 shown in FIG. 1. Radio navaid 16 which may have at least three physical portions, two of which are distant from the aircraft and which have a known position such as a respective transmitter location on the earth's surface. A third position of navaid 16 is positioned on the aircraft or other platform such as a helicopter, ship, land vehicle, etc. The output of radio navaid 16 provides a plurality of samples indicative of the position of the aircraft at respective times which may be, for example, spaced apart in time by an intersample period $\Delta T_S$ The plurality of samples may all be taken within a time interval $\Delta T_M$. Lead 20 is coupled to an input of geometric collinear estimator 34 which has stored therein the known positions of the radio navaid 16 portions which are distant from aircraft 26. Geometric collinear estimator 34 functions to calculate the angle between intersecting lines of position from at least two distant portions of radio navaid 16 and aircraft 26. At time the angle $\gamma$ between the intersecting lines of position at aircraft 26 is less than or equal to, for example, 30° or greater than or equal to 150°, the output of the geometric collinear estimator 34 on lead 31 will go high causing switch 36 to couple lead 38 to lead 22. At other times switch 36 will couple lead 40 to lead 22.

The output of radio navaid 16 is also coupled over lead 20 to an input of biased estimator 42 and to an input of unbiased estimator 43. Unbiased estimator 43 may be, for example, a least mean square estimator to provide position and velocity estimates as a function of time over lead 40 to an input of switch 36 and to an input of K parameter 44. K parameter 44 functions to provide a bias value k over lead 46 to an input of biased estimator 42. An optimum K value may be derived, for example, from equation 6.

$$\hat{K}_{OP} = \frac{PS^2}{\underline{\beta}_{OLS}^T \underline{\beta}_{OLS}} \tag{6}$$

In equation 6, P is the number of variables and $S^2$ is the sample standard deviation.

Biased estimator 42 may be, for example, a Ridge estimator having a bias value K as shown in equation 7. As noted previously, K is called the Ridge parameter in the literature.

$$\hat{\beta}_R = (H^T H + K_{OP} I)^{-1} H^T \delta \underline{R} \tag{7}$$

A biased estimator 42 or Ridge estimator can have a smaller mean square error than an unbiased estimator 43, because the biased estimator 42 relaxes the unbiased condition. It allows a small bias error in order to achieve a large variance reduction. The result is a smaller mean square error than that achieved by conventional least mean square (LMS) estimation.

Figure 3:
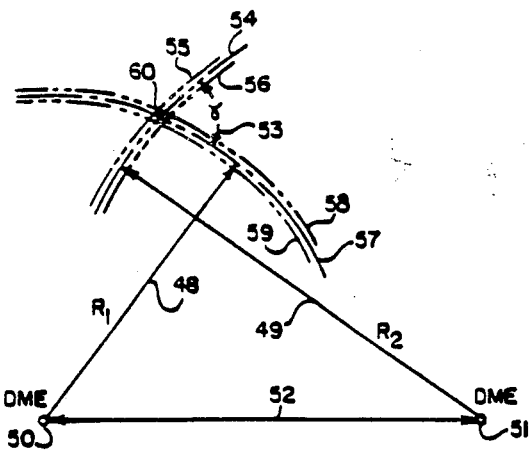
FIG. 3 is a diagram showing the intersection of two lines of position in a position-fix navigation system.

FIG. 3 is a diagram showing the intersection of two lines of position (LOPs) 48 and 49 in a position-fix navigation system having distance measuring equipment 50 and 51 spaced apart from one another by a distance shown by arrow 52. In FIG. 3, the LOPs intersect at an angle $\gamma$ which is optimum for precise measurement when $\gamma$ is equal to or near 90°. The angle $\gamma$ is shown by arrow 53. LOP 49 traces on an arc 54 having a spread in possible values of measurement shown by lines 55 and 56. LOP 48 traces on an arc 57 having a spread in possibles values of measurement shown by arcs 58 and 59. The point of intersection of arcs 54 and 57 show the position of aircraft 26 and the area enclosed by line 55, 58, 56 and 59 shown as area 60 shows the area of possible values of position measurement of aircraft 26.

Figure 4:
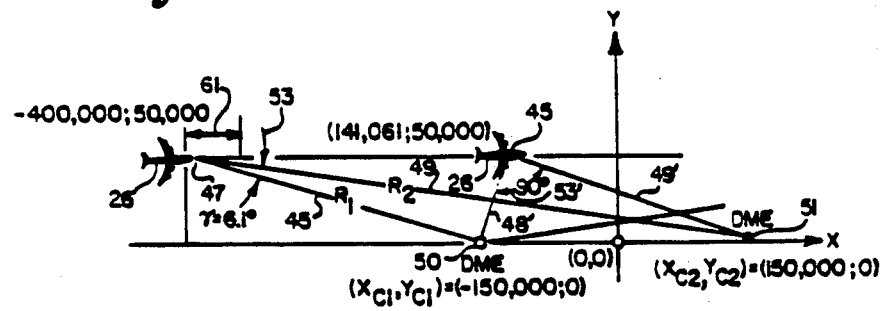
FIG. 4 is a diagram showing the intersection of two lines of position intersecting at a small angle in a position-fix navigation system.

FIG. 4 is a diagram showing the intersection of two lines of position 48 and 49 at a small angle $\gamma$ in a position-fix navigation system. In FIG. 4 like references are used for lines of position and apparatus as used in FIG. 3. FIG. 4 shows an X and Y horizontal coordinate system having an origin 0,0. DME 50 is located at (−150000;0). DME 51 is located at 150,000'. The lines of position 48 and 49 are shown intersecting at aircraft 26 at an angle of 6.1° as shown by arrow 53. Radio navaid 16 would provide n samples in time interval $\Delta T_M$ while aircraft 26 travels a short distance shown by arrow 61. Aircraft 26 may be, for example, at an initial horizontal position of X=−400,000'and Y=50,000'. Aircraft 26 may be flying on a straight course at constant velocity V over the time interval $\Delta T_M$.

FIG. 4 also shows aircraft 26 at a later time at a position X,Y of (−141,061; 50,000). Lines of position of 48' and 49' to aircraft 26 from DME 50 and 51, respectively form an angle of 90° at their intersection at aircraft 26. An angle of 90° provides the most favorable measurement conditions for measuring aircraft position. Subsequent in time as aircraft 26 flies along to position X, Y of (400,000; 50,000) the lines of position 48" and 49" will again intersect at an angle of 6.1°. As the aircraft continues to fly in the direction past 400,000', the angle γ will continue to decrease.

The intersection of the lines of position 48 and 49 shown in FIG. 4 may be found by solving equations 8 and 9 for $X_0$ and $Y_0$.

$$R_1^2 = (X - X_{C1})^2 + (Y - Y_{C1})^2 \tag{8}$$

$$R_2^2 = (X - X_{C2})^2 + (Y - Y_{C2})^2 \tag{9}$$

The solution for $X_0$ and $X_0$ is shown in equations 10 and 11 where $R_1$ is the distance to DME 50 and $R_2$ is the distance to DME 51 and $X_{C1}$ is the position of DME 50.

$$X_0 = \frac{R_1^2 - R_2^2}{4X_{Cl}} \tag{10}$$

$$Y_0 = \left[ R_1^2 - \left( \frac{R_1^2 - R_2^2}{4X_{Cl}} - X_{Cl} \right)^2 \right]^{\frac{1}{2}} \tag{11}$$

By utilizing equations 10 and 11, the initial position of aircraft 26 may be determined and geometric collinear estimator 34 shown in FIG. 2 may calculate the angle formed by the intersection of the lines of position 48 and 49.

Figure 5:
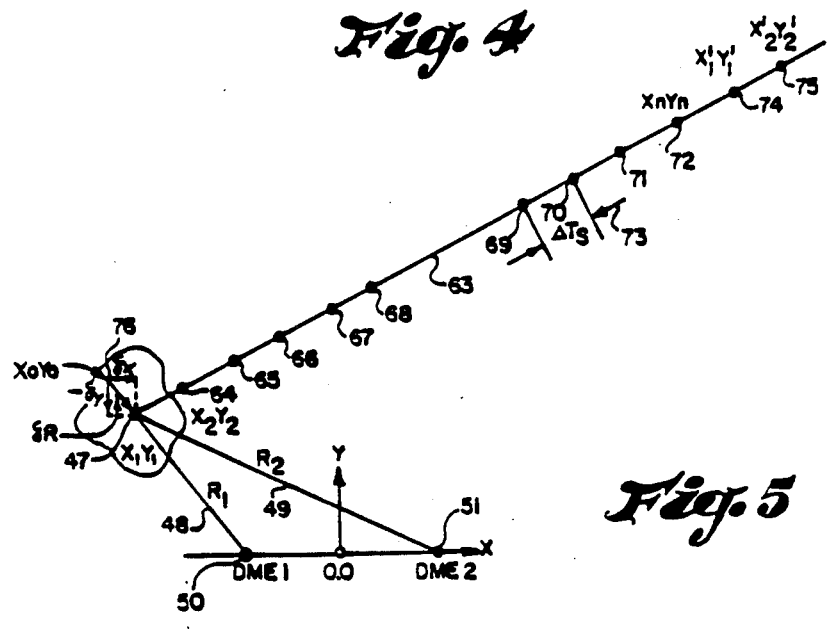
FIG. 5 is a diagram showing position samples taken along a flight path.

FIG. 5 is a diagram showing the position of aircraft 26 along a desired flight path 63. DME 50 and DME 51 enable radio navaid 16 to generate position samples 47, and 64–72 shown along flight path 63 having an intersample time $\Delta T_S$ shown by arrow 73. The number of samples that may be processed at one time may be, for example, sixteen samples associated with DME 50 and sixteen samples associated with DME 51. These samples are taken over a time interval $\Delta T_M$ with the assumption that the partial derivatives of $R_1$ and $R_2$ with respect to X do not change appreciatively. For processing the block of data, 32 samples, it is further assumed that the aircraft is flying a straight course at constant velocity over the measurement interval $\Delta T_M$. Additional blocks of data later in time may be obtained by radio navaid 16 for aircraft 26 at positions 72, 74, 75 along flight path 63.

Figure 6:
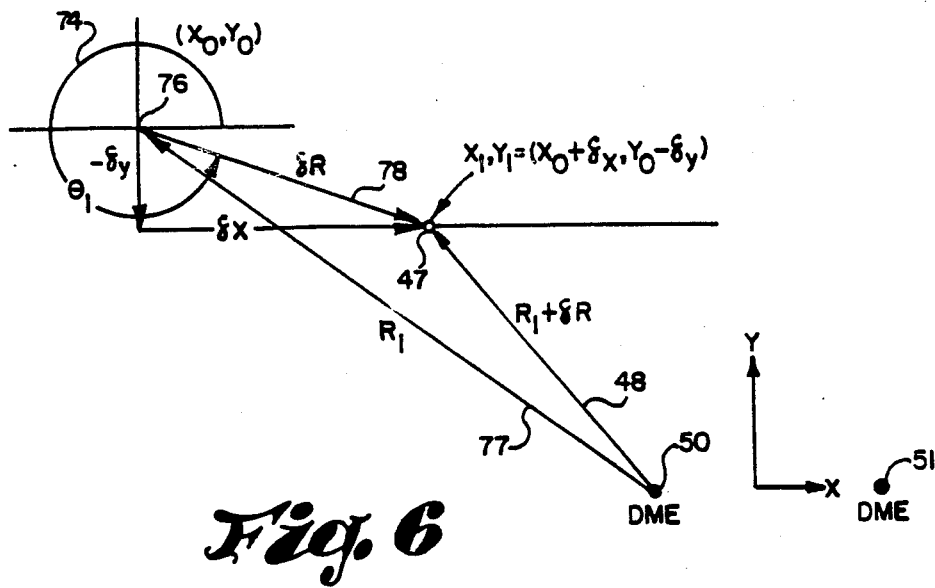
FIG. 6 is a diagram showing two position samples along a flight path.

Referring to FIG. 6, a diagram showing two position samples 76 and 47 is shown along with lines of position 77 and 48 from DME 50. The flight path segment 78 extends between position sample 76 and 47. Flight path segment 78 is more generally described as R. By using the well known Taylor series linearization of non-linear geometry, R may be expressed as shown in equation 12. In equation 12, $_1$ is shown in FIG. 6 by arrow 79 which is measured from a horizontal line in a counterclockwise direction to flight path segment 78, R.

$$\delta R = \frac{\partial R_1}{\partial X}\bigg|_{X_0, Y_0} \delta X + \frac{\partial R_1}{\partial Y}\bigg|_{X_0, Y_0} \delta Y = \cos\theta_1 \delta X + \sin\theta_1 \delta Y \tag{12}$$

A linear model of aircraft position and movement is obtained by differentiating equations 8 and 9 to obtain equation 13.

$$\begin{bmatrix} \delta R_1 \\ \delta R_2 \end{bmatrix} = \begin{bmatrix} \frac{\partial R_1}{\partial X} & \frac{\partial R_1}{\partial Y} \\ \frac{\partial R_2}{\partial X} & \frac{\partial R_1}{\partial Y} \end{bmatrix} \begin{bmatrix} \delta X \\ \delta Y \end{bmatrix} + \begin{bmatrix} e_1 \\ e_2 \end{bmatrix} \tag{13}$$

In Equation 13

$$\begin{bmatrix} e_1 \\ e_2 \end{bmatrix}$$

is the noise source $$\begin{bmatrix} \frac{\partial R_1}{\partial X} & \frac{\partial R_1}{\partial Y} \\ \frac{\partial R_2}{\partial X} & \frac{\partial R_1}{\partial Y} \end{bmatrix} \begin{bmatrix} \delta X \\ \delta Y \end{bmatrix}$$

is the known deterministic part.

The aircraft position at the ith measurement is given by Equation 14 and 15.

$$X_i = X_1 + iV_x\Delta T_s; \quad i = 0, 1, 2 \ldots n-1 \tag{14}$$

$$Y_i = Y_1 + iV_Y\Delta T_s \tag{15}$$

After n measurements the initial estimate position is given by Equations 16 and 17.

$$\hat{X}_1 = X_o + \hat{\delta X} \tag{16}$$

$$\hat{Y}_1 = Y_o + \hat{\delta Y} \tag{17}$$

The estimated position at $t_o + T_M$ is given by Equations 18 and 19.

$$\hat{X}_n = \hat{X}_1 + (n-1)\hat{V}_x\Delta T_s \tag{18}$$

$$\hat{Y}_n = \hat{Y}_1 + (n-1)\hat{V}_Y\Delta T_s \tag{19}$$

The estimated aircraft speed is given by Equation 20.

$$|V| = \sqrt{V_x^2 + V_y^2} \tag{20}$$

For the ith measurement let $\delta R_{i1} = R_{i1} - R_{01}$ and $\delta R_{i2} = R_{i2} - R_{02}$. After n pairs of measurements the linear model equation is given by Equation 21.

$$\begin{bmatrix} \delta R_{11} \\ \delta R_{12} \\ \delta R_{21} \\ \delta R_{22} \\ \vdots \\ \delta R_{i1} \\ \delta R_{i2} \\ \vdots \\ \delta R_{n,1} \\ \delta R_{n,2} \end{bmatrix} = \begin{bmatrix} \frac{\partial R_1}{\partial x} & \frac{\partial R_1}{\partial y} & 0 & 0 \\ \frac{\partial R_2}{\partial x} & \frac{\partial R_2}{\partial y} & 0 & 0 \\ \frac{\partial R_1}{\partial x} & \frac{\partial R_1}{\partial y} & \Delta T_s \frac{\partial R_1}{\partial x} & \Delta T_s \frac{\partial R_1}{\partial y} \\ \frac{\partial R_2}{\partial x} & \frac{\partial R_2}{\partial y} & \Delta T_s \frac{\partial R_2}{\partial x} & \Delta T_s \frac{\partial R_2}{\partial y} \\ \vdots & \vdots & \vdots & \vdots \\ \frac{\partial R_1}{\partial x} & \frac{\partial R_1}{\partial y} & i\Delta T_s \frac{\partial R_1}{\partial x} & i\Delta T_s \frac{\partial R_1}{\partial y} \\ \vdots & \vdots & \vdots & \vdots \\ \frac{\partial R_2}{\partial x} & \frac{\partial R_2}{\partial y} & (n-1)\Delta T_s \frac{\partial R_2}{\partial x} & (n-1)\Delta T_s \frac{\partial R_1}{\partial y} \end{bmatrix} \begin{bmatrix} \delta X \\ \delta Y \\ V_x \\ V_y \end{bmatrix} + \begin{bmatrix} e_{11} \\ e_{12} \\ \vdots \\ e_{i1} \\ e_{i2} \\ \vdots \\ e_{n1} \\ e_{n2} \end{bmatrix} \quad (21)$$

where $[e_{11}, e_{12} \ldots e_{n1}, e_{n2}] = \underline{e}^T$ is the error vector. The error vector has a covariance given by Equations 22 and 23.

$$W = E[\underline{e}, \underline{e}^T] = \begin{bmatrix} W_1 & & O \\ & W_2 & \\ O & & W_n \end{bmatrix} \quad (22)$$

$$W_i = \begin{bmatrix} \sigma_1^2 & O \\ O & \sigma_2^2 \end{bmatrix} \quad (23)$$

Equation 21 may be rewritten as Equation 24.

$$\underline{\delta R} = H\underline{\beta} + \underline{e} \quad (24)$$

In Equation 24 $\underline{\delta R}$ is the $2n \times 1$ measurement vector, H is the $2n \times 4$ predicator matrix, $\underline{\beta}$ is the $4 \times 1$ regression coefficient vector. The notation has changed from the usual statistical symbols as used in Equation (1) to avoid confusion with the notation used in the navigation geometry. Using FIGS. 5 and 6 and Equation 12, the Taylor coefficients are given in Equations 25-28.

$$\frac{\partial R_1}{\partial x} = \frac{(x - x_{c1})}{R_1} = \cos \theta_1 \quad (25)$$

$$\frac{\partial R_2}{\partial x} = \frac{(x - x_{c2})}{R_2} = \cos \theta_2 \quad (26)$$

-continued $$\frac{\partial R_1}{\partial y} = \frac{(y - y_1)}{R_1} = \sin \theta_1 \quad (27)$$

$$\frac{\partial R_2}{\partial y} = \frac{y - y_2}{R_2} = \sin \theta_2 \quad (28)$$

The average of 30 pairs of range measurements ($\bar{R}_{01}$, $\bar{R}_{02}$), as shown n FIG. 5, using DME 50 and DME 51 may be made to determine the initial point $X_0 Y_0$ at $t = t_1$ using Equations 10 and 11.

The unbiased estimator 42 shown in FIG. 2 may use a least mean square (LMS) solution to equation 21 which was rewritten as equation 24. The LMS solution to equation 21 or 24 is given by equation 29.

$$\underline{\beta}_{OLS} = (H^T W^{-1} H)^{-1} H^T W^{-1} \underline{\delta R} \quad (29)$$

In equation 29 the conditions shown in equation 30 are assumed.

$$MSE[\hat{\beta}_G] = \text{TRACE VAR}[\hat{\beta}_G] = \text{TRACE } [H^T W^{-1} H]^{-1} \quad (30)$$

In Equation 29, $H^T H$ will now be given in Equation 31 using Equations 21 and 25-28 and assuming, $$H^T H = \begin{bmatrix} A \cdot n & B \cdot n & A \cdot \Delta T_s \sum_{i=1}^{n-1} i & B \cdot \Delta T_s \sum_{i=1}^{n-1} i \\ B \cdot n & C \cdot n & B \cdot \Delta T_s \sum_{i=1}^{n-1} i & C \cdot \Delta T_s \sum_{i=1}^{n-1} i \\ A \cdot \Delta T_s \sum_{i=1}^{n-1} i & B \cdot \Delta T_s \sum_{i=1}^{n-1} i & A \cdot \Delta T_s^2 \sum_{i=1}^{n-1} i^2 & B \cdot \Delta T_s^2 \sum_{i=1}^{n-1} i^2 \\ B \cdot \Delta T_s \sum_{i=1}^{n-1} i & C \cdot \Delta T_s \sum_{i=1}^{n-1} i & B \cdot \Delta T_s^2 \sum_{i=1}^{n-1} i^2 & C \cdot \Delta T_s^2 \sum_{i=1}^{n-1} i^2 \end{bmatrix} \quad (31)$$

where
$A = \cos^2 \theta_1 + \cos^2 \theta_2$
$B = \cos \theta_1 \sin \theta_1 + \cos \theta_2 \sin \theta_2$
$C = \sin^2 \theta_1 + \sin^2 \theta_2$ From Equations 21 and 25-28, $H^T R$ is given in Equation 32.

$$H^T \delta R = \begin{bmatrix} \cos\theta_1 \sum_{i=1}^{n} \delta R_{i1} + \cos\theta_2 \sum_{i=1}^{n} \delta R_{i2} \\ \sin\theta_1 \sum_{i=1}^{n} \delta R_{i1} + \sin\theta_2 \sum_{i=1}^{n} \delta R_{i2} \\ \cos\theta_1 \Delta T_s \sum_{i=2}^{n} \delta R_{i1} + \cos\theta_2 \Delta T_s \sum_{i=2}^{n} \delta R_{i2} \\ \sin\theta_1 \Delta T_s \sum_{i=2}^{n} \delta R_{i1} + \sin\theta_2 \Delta T_s \sum_{i=2}^{n} \delta R_{i2} \end{bmatrix} \quad (32)$$

In equations 29-31 and by letting the covariance W equal I the identity matrix, equation 29 may be rewritten as equation 33.

$$\hat{\underline{\beta}}_{OLS} = (H^T H)^{-1} H^T \underline{\delta R} \quad (33)$$

wherein the calculation of equation 33 may be facilitated by using equations 31 and 32. In equation 33 $\hat{\underline{\beta}}_{OLS}$ is the ordinary least square solution for the vector as shown in equation 34. The vector given in equation 34 is provided on line 40 from unbiased estimator 43 shown in FIG. 2.

$$\hat{\underline{\beta}}_{OLS} = [\delta X, \delta Y, V_x, V_y]^T \quad (34)$$

Biased estimator 42 may use a Ridge Regression solution to solve Equations 21 or 24 as shown in Equation 35.

$$\hat{\underline{\beta}}_R = (H^T H^{-1} H + KI)^{-1} H^T W^{-1} \underline{\delta R} \quad (35)$$

By letting the covariance W equal I where I is the identify matrix, equation 35 may be written as shown in Equation 36.

$$\hat{\underline{\beta}}_R = (H^T H + KI)^{-1} H^T \underline{\delta R} \quad (36)$$

In equation 36, K is supplied by K parameter 44 over line 46 which is shown in FIG. 2. I is the identity matrix which is a square matrix with zeros except along the diagonal which are ones. Equation 36 may now be solved using Equations 31 and 32. The solution of Equation 36 is a vector shown in Equation 35.

$$\hat{\underline{\beta}}_R = [\delta X, \delta Y, V_x, V_y]^T \quad (37)$$

K parameter 44 functions to supply a value K to biased estimator 42 which is used when biased estimator 42 solves equation 36. K parameter 44 may be, for example, the Ridge parameter K. An automatic method for choosing $K_{OP}$ is given in Equation 38.

$$\hat{K}_{OP} = \frac{P S^2}{\hat{\beta}_{OLS}^T \hat{\beta}_{OLS}} \quad (38)$$

In Equation 38 P is the number of variables in the linear model (P=4) and $S^2$ is the sample standard deviation based upon (N−P) samples (i.e. 28). $S^2$ may be determined using equation 39.

$$S^2 = \frac{1}{n-P} \sum_{i=1}^{32} (\delta R_i^2) \quad (39)$$

Figure 7:
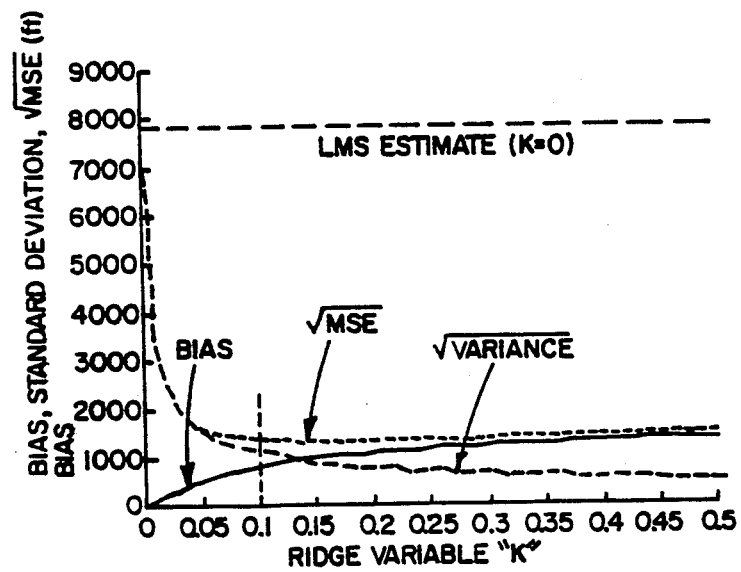
FIG. 7 is a graph of the Bias, Standard Deviation and $(MSE)^{\frac{1}{2}}$ versus the Ridge Variable K.

Alternatively, K parameter 44 may select a K value which is passed on to biased estimator 42 to calculate the corresponding Ridge estimates $\beta_R$. The K parameter 44 may submit incrementally increasing K values to biased estimator 42 which will calculate the corresponding Ridge estimates $\beta_R$. The optimum K value would be the one at which the Ridge estimates stabilize with small changes is K as shown in FIG. 7.

Figure 8:
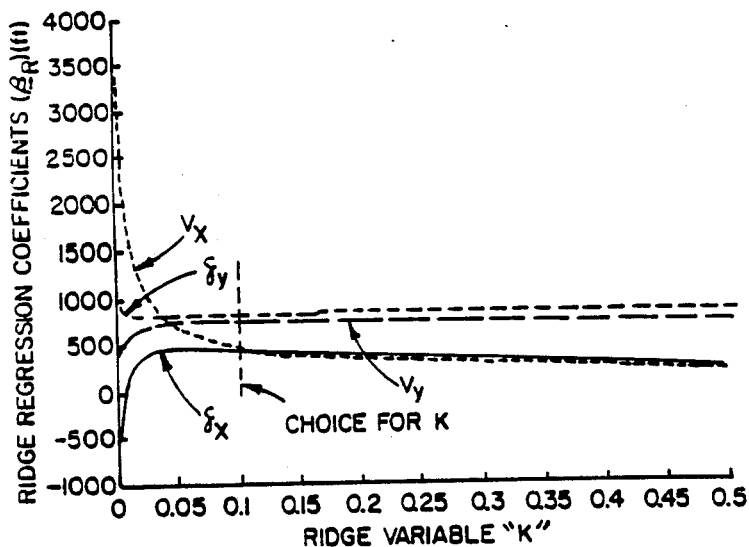
FIG. 8 is a graph of the Ridge Regression coefficient versus the Ridge Variable K.

The results are plotted in FIG. 8; note that as expected K=0.1 is near the minimum MSE. The data for FIG. 8 is given in Table IA.

TABLE 1A

| | δx 1.0E = 003* | δy | $V_x$ | $V_y$ |
| --- | --- | --- | --- | --- |
| K = 0.00 | −0.7868 | 0.9910 | 3.7272 | 0.3047 |
| | 0.1787 | 0.8507 | 1.6541 | 0.6055 |
| | 0.3610 | 0.8246 | 1.1636 | 0.6754 |
| | 0.4205 | 0.8164 | 0.9357 | 0.7070 |
| | 0.4410 | 0.8138 | 0.8003 | 0.7252 |
| K = 0.05 | 0.4453 | 0.8137 | 0.7090 | 0.7369 |
| | 0.4422 | 0.8146 | 0.6422 | 0.7451 |
| | 0.4356 | 0.8160 | 0.5907 | 0.7510 |
| | 0.4272 | 0.8177 | 0.5495 | 0.7555 |
| | 0.4181 | 0.8195 | 0.5156 | 0.7589 |
| K = 0.10 | 0.4087 | 0.8213 | 0.4871 | 0.7615 |
| | 0.3995 | 0.8230 | 0.4627 | 0.7636 |

The contour ellipsoid for the position coordinates can be determined using $H_p$ which is a partition of the matrix H as given by equation 21. The details are given in FIG. 9. The subspace for the velocity estimates can also be analyzed using FIG. 9. Table IB summarizes the results wherein the Ridge Regression technique yielded useable position estimates where γ=6.1°, whereas the LMS estimates given in Table IB are not operationally useable.

TABLE IB

| | | γ = 6.1° | |
| --- | --- | --- | --- |
| | TRUE VALUE | LMS ESTIMATE k = 0 | RIDGE ESTIMATE k = 0.1 |
| δx | 1000 FT | −786 FT | 418 FT |
| δy | 1000 FT | 991 FT | 819 FT |
| $V_x$ | 727 FT/SEC | 3727 FT/SEC | 515 FT/SEC |
| $V_y$ | 420 FT/SEC | 304 FT/SEC | 758 FT/SEC |
| NOISE MODEL | STANDARD DEVIATION (SD) = 600 | SAMPLE SD = 550.4 FT MEAN = 100.7 FT | |

In fact, even though the LMS condition index was moderate (19.8), one of the position estimates had the wrong sign.

Table II summarizes the results wherein the Ridge Regression technique and the LMS technique yielded useable position estimates where γ=90°.

TABLE II

| | TRUE VALUE | $\gamma = 90°$ LMS ESTIMATE k = 0 | RIDGE ESTIMATE k = 0.1 |
|---|---|---|---|
| $\delta_X$ | 1000 FT | 1045 FT | 1043 FT |
| $\delta_Y$ | 1000 FT | 712 FT | 718 FT |
| $V_X$ | 727 FT/SEC | 625 FT/SEC | 616 FT/SEC |
| $V_Y$ | 420 FT/SEC | 504 FT/SEC | 493 FT/SEC |
| NOISE | STANDARD DEVIATION (SD) = 600 | SD = 550.4 FT MEAN = 100.7 FT | |

Figure 10:
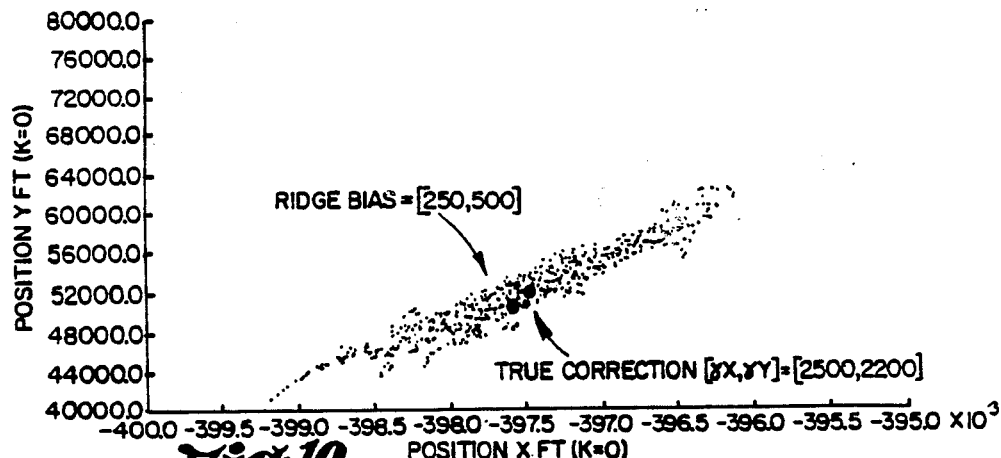
FIGS. 10 and 11 are scatter plots of 1000 $\hat{\beta}_{OLS}$ 16-sample estimates.
Figure 11:
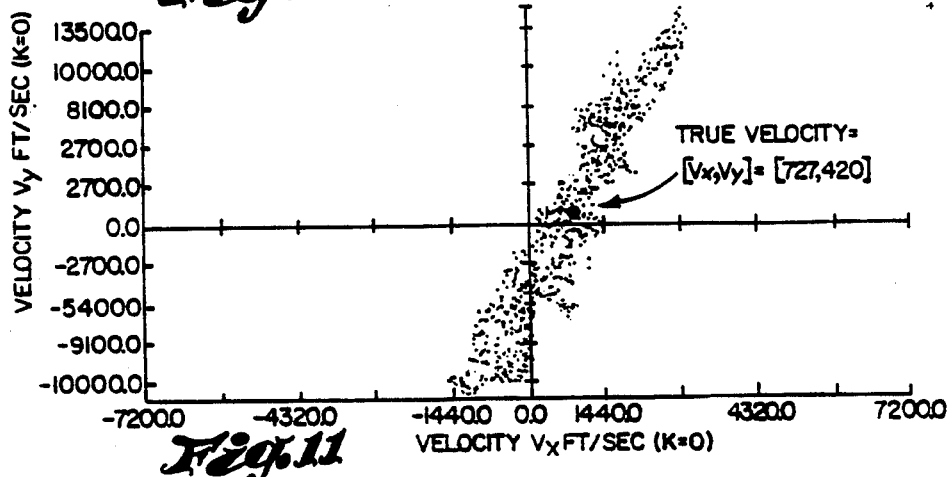
Figure 12:
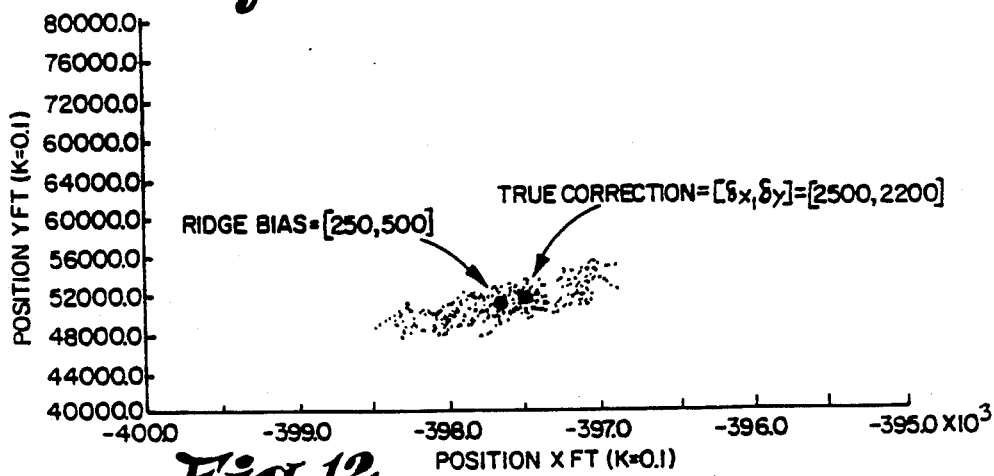
FIGS. 12 and 13 are scatter plots of 1000 $\hat{\beta}_R$ 16-sample estimates.
Figure 13:
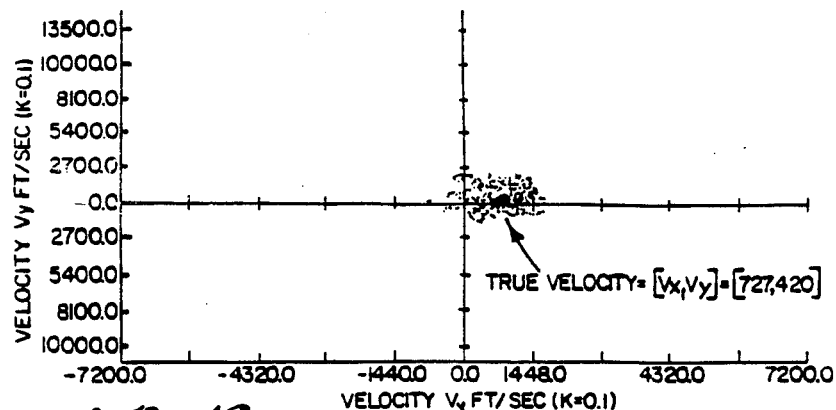

A computer simulation was performed in which 1000 sample pairs of size N=16 were taken. From these samples 1000 estimates were determined and plotted in FIGS. 10–13. FIGS. 10 and 11 show a plot of the ordinary LMS estimate for $\delta\hat{X}$, $\delta\hat{Y}$, $\hat{V}_x$ and $\hat{V}_y$ while FIGS. 12 and 13 show the Ridge estimates for K=0.1. FIGS. 10–13 were obtained using equation 39.5 where Q is a general point in the estimation space.

$$\overline{YQ}^2 = \overline{YP}^2 + \overline{PQ}^2 \tag{39.5}$$

Figure 14:
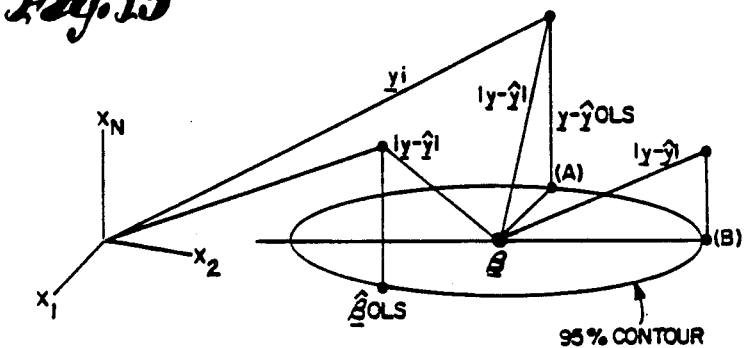
FIG. 14 is a scatter plot of $\hat{\beta}_{OLS}$ estimates for $\underline{Y} - \hat{\underline{Y}}$ equal to a constant.

The four dimension estimation space has been partitional into an initial position space shown in FIGS. 10 and 12 and the velocity space shown in FIGS. 11 and 13. These scatter plots are computer simulation realizations of the concept illustrated in FIG. 14. For these simulations the true position of the aircraft was at (−400,000′, 50,000′) The combined calibration and initial position errors were $[\delta X, \delta Y] = [2500, 2200]$ and the noise standard deviation was 600 feet. The aircraft was flying from the (−400,000′, 50,000′) waypoint at 30° with a velocity of 840 feet/second. Thus, the true speeds were $V_x = 727$ feet/second and $V_y = 420$ feet/second. As is evident in the scatter plots of FIGS. 12 and 13, the GDOP has been reduced without introducing unacceptable bias. Equally important they demonstrate that the Ridge estimates confidence region are well within the LMS confidence regions. The scatter plots of FIGS. 12 and 13 support the major result of Ridge Analysis, that is by selecting the Ridge parameter K at that point where the $\hat{\beta}_R$ estimates are stable estimates will be produced whose variances (and MSE) are less than or equal to the LMS estimates. The above analysis addressed the estimates of $\delta X$, $\delta Y$, $V_x$ and $V_y$. These estimates are then inserted into equations 14 and 15 to obtain the aircraft's position at $\Delta T_M$. An analysis of these final position estimates $X_n$, $Y_n$ was not performed. The calculations, however, are straight-forward.

The model described and analyzed above is valid wherever the aircraft velocity has a constant direction and its speed remains essentially constant over the measurement interval of $\Delta T_M$. The model can be generalized to include acceleration maneuvers.

The second case will now be analyzed. When the aircraft position is at position 47 (−400,000, 50,000) as indicated in FIG. 4, multicollinearity (GDOP) should be clearly present because $\gamma = 6.1°$. Table III presents the first four terms (out of 16) of the H matrix given by Equation 21.

TABLE III

| | $\delta_X$ | $\delta_Y$ | $V_X$ | $V_Y$ |
|---|---|---|---|---|
| H = PREDICTOR MATRIX | | | | |
| First 4 Pairs of Measurements | 0.1959 | 0.9806 | 0 | 0 |
| | 0.0924 | 0.9957 | 0 | 0 |
| | 0.1959 | 0.9806 | 0.0122 | 0.0613 |

TABLE III-continued

| | $\delta_X$ | $\delta_Y$ | $V_X$ | $V_Y$ |
|---|---|---|---|---|
| H = | 0.0924 | 0.9957 | 0.0058 | 0.0622 |
| | 0.1959 | 0.9806 | 0.0245 | 0.1226 |
| | 0.0924 | 0.9957 | 0.0115 | 0.1245 |
| | 0.1959 | 0.9806 | 0.0367 | 0.1839 |
| | 0.0924 | 0.9957 | 0.0173 | 0.1867 |
| | 0.7508 | 4.5460 | 0.3520 | 2.1309 |
| | 4.5460 | 31.2492 | 2.1309 | 14.6480 |
| $H^TH =$ | 0.3520 | 2.1309 | 0.2273 | 1.3762 |
| | 2.1309 | 14.6480 | 1.3762 | 9.4602 |
| V = EIGENVECTOR | | | | |
| | 0.1459 | 1.0000 | −0.5025 | −0.0733 |
| V = | 1.0000 | −0.1459 | 0.0733 | −0.5025 |
| | 0.0733 | 0.5025 | 1.0000 | 0.1459 |
| | 0.5025 | −0.0733 | −0.1459 | 1.0000 |
| L = EIGENVALUES | | | | |
| | 39.4294 | 0 | 0 | 0 |
| L = | 0 | 0.1083 | 0 | 0 |
| | 0 | 0 | 0.0059 | 0 |
| | 0 | 0 | 0 | 2.1440 |
| Eigenvalues of Unit Scaled X′X | 3.590 | 0.287 | 0.114 | 0.009 |
| Condition Indices | 1.000 | 3.537 | 5.614 | 19.856 |

Also shown are the values for the $H^TH$ matrix, its eigenvectors V and its eigenvalues L. The matrix $H^T$ was calculated using equation 31. A sample of 16 pairs of range measurements ($R_1$ and $R_2$) were taken to determine $\underline{B}_R$. The true initial correction is X, Y = 1000,1000. (Table III)

The regression coefficients were calculated for values of K ranging from K=0 (LMS) to K=0.5. Clearly, the optimum choice for minimum bias, is K=0.1 as shown in FIG. 7. At this value the Ridge traces have just stabilized and the variance improvement with increasing K is still overcoming the rate of bias increase. This point is evident when the MSE is plotted as a function of K. The bias $(\hat{\beta}_R)$, $\sqrt{\text{variance}\,(\hat{\beta}_R)}$ and $\sqrt{\text{MSE}\,(\hat{\beta}_R)}$ were calculated using equations 40 and 44 where $$\text{VAR}[\hat{\beta}_R] = G_K X^T \text{VAR}[Y] X G_k^T \tag{40}$$

$$\text{VAR}[\hat{\beta}_R] = \sigma^2 G_K X^T X G_K^T \tag{41}$$

$$\text{VAR}[\hat{\beta}_R] = \sigma^2 X^T X [X^T X + KI]^{-2} \tag{42}$$

$$\text{MSE}[\hat{\beta}_R] = E[(\hat{\beta}_R - \beta)^T (\hat{\beta}_R - \beta)] \tag{43}$$

$$\text{MSE}[\hat{\beta}_R] = \text{TRACE}[\sigma^2 X^T X [X^T X + KI]^{-2}] + K^2 \beta^T [X^T X + KI]^{-2} \beta \tag{44}$$

In equations 40 through 44, equations 45 through 47 were used.

$$\hat{\beta}_R = [\delta\hat{X}, \delta\hat{Y}, \hat{V}_x, \hat{V}_y] \tag{45}$$

$$\hat{\beta}^T = [1000, 1000, 727, 420] \tag{46}$$

$$\delta = 600 \text{ feet}. \tag{47}$$

A method and apparatus has been described for determining the position and velocity of a moving platform comprising a radio navigation aid having at least three portions, two of which are distant from the platform and having respective positions for providing to the platform a plurality of samples indicative of the position of the platform at respective times, a position estimator for receiving the plurality of samples for generating an estimate of position and velocity both with an unbiased estimator and with a biased estimator and selecting the estimate of position and velocity from the biased estimator at times the spatial geometry of the moving platform is substantially collinear with the two portions of the distant radio navigation aid.

A RIDGE REGRESSION NAVIGATION EXAMPLE

Due to the complexity of the subject, additional information is provided below as an aid to understanding the properties of a biased estimator. The discussion below will, (a) assume the aircraft speed is small so that velocity calculations are not necessary. This will simplify Equation 21.

(b) review the biased/unbiased estimation procedures using the "position only" equations, (c) describe the procedure for obtaining the initial position estimate, (d) determine whether GDOP exists; if GDOP is present, use the biased estimator (i.e., the Ridge Estimator)

(e) in the context of the simple example, perform the detailed calculations to obtain the results.

The Ridge Regression algorithm is implemented as follows:

(1) Linearize Locus of Position Equations (Eq. 8 and 9).

(2) Determine initial aircraft position using DMS estimation on 30 second of data.

(3) Estimate aircraft position using Ridge Regression in one second estimates using previous estimates as the new approximate position of the aircraft.

The equations of position are given in (8 and 9). Their linearized models in terms of a.c range ($R_1$, $R_2$) and its displacement ($\delta X$, $\delta Y$) from an initial position ($X_o$, $Y_o$) are:

$$R_1 = R_{01} + \frac{\partial R_1}{\partial X} \delta X + \frac{\partial R_1}{\partial Y} \delta Y \tag{48}$$

$$R_2 = R_{02} + \frac{\partial R_2}{\partial X} \delta X + \frac{\partial R_2}{\partial Y} \delta Y \tag{49}$$

Figure 15:
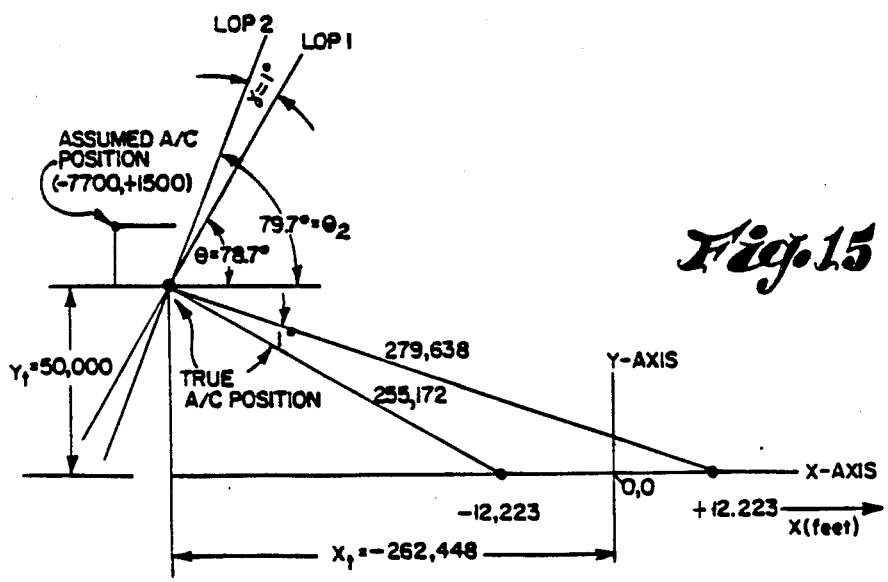
FIG. 15 is a diagram showing the intersection of two lines of position.

$R_{o1}$ and $R_{o2}$ are the initial approximate ranges to the aircraft. From the navigation geometry shown in FIG. 15, the partial derivatives in (48) and (49) are:

$$\frac{\partial R_1}{\partial x} = \cos \theta_1 \tag{25}$$

$$\frac{\partial R_2}{\partial x} = \cos \theta_2 \tag{26}$$

$$\frac{\partial R_1}{\partial y} = \cos \theta_2 \tag{27}$$

-continued $$\frac{\partial R_2}{\partial y} = \cos \theta_2 \tag{28}$$

Let $$\delta R_1 = R_1 - R_{01} \tag{50.1}$$

where $R_1$ and $R_2$ are measured values $$\delta R_2 = R_2 - R_{02} \tag{50.2}$$

Then (48) and (49) become $$\begin{bmatrix} \delta R_1 \\ \delta R_2 \end{bmatrix} = \begin{bmatrix} \cos \theta_1 & \sin \theta_1 \\ \cos \theta_2 & \sin \theta_2 \end{bmatrix} \begin{bmatrix} \delta x \\ \delta y \end{bmatrix} = H_p \delta \beta \tag{51}$$

Equation (51) constitutes one pair of measurements. The example navigation system repeats these measurements 16 times in one second, therefore, $$\delta R = H \delta \beta \text{ where } H^T = \overbrace{[H_p \, H_p \ldots H_p]}^{\text{16 SUBMATRICES}} \tag{52}$$

$\underline{\delta R}$ is a $32 \times 1$ vector, $H_p$ is a $32 \times 2$ matrix and $\underline{\delta \beta}$ is a $2 \times 1$ vector.

As noted earlier, Equation (51) only incorporates the position information, so that the essential Ridge Regression ideas become more visible. The complete expression including the velocity terms is given in (21). The aircraft position is determined by first guessing the aircraft's position and then using the unbiased or biased algorithm depending upon the existence GDOP (see FIG. 2) (e.g. Ridge Regression) to calculate the correction $\delta \beta$ to the initial guess to determine the aircraft's true position. Since the aircraft's velocity is not being determined at this time, it is assumed that its speed is small. Therefore, (A) Guess the aircraft's present position using ($X_o$, $Y_o$) where ($X_t$, $Y_t$) is its true position. ($X_o$, $Y_o$) is approximated by taking 30 apirs of range measurements and calculating the sample means $R_{o1}$ and $R_{o2}$.

(B) Insert $R_{o1}$ and $R_{o2}$ into Equations 53a and 53b to obtain ($X_o$, $Y_o$). The equations relating to $R_{o1}$, $R_{o2}$, $X_{c1}$, $Y_{c1}$, $X_{c2}$, $Y_{c2}$ to ($X_o$, $Y_o$)

$$X_0 = \frac{R_{01}^2 - R_{02}^2}{4x_{c1}} \tag{53a}$$

$$Y_0 = \sqrt{R_{01}^2 - \left( \frac{R_{01}^2 - R_{02}^2}{4x_{c1}} - x_{c1} \right)^2} \tag{53b}$$

(C) $R_{o1}$ and $R_{o2}$ are next subtracted from the 16 pairs of measured values to obtain $\delta R$ as indicated in (52).

(D) Since $H_p$ is given by the coordinate geometry and $\delta R$ has been determined from (C) above, Equation 52 can be solved to obtain $\underline{\delta \beta}$. The computed values of $$\delta \beta = \begin{bmatrix} \delta x \\ \delta y \end{bmatrix}$$

are then added to $(X_o, Y_o)$ to obtain the true position estimate of the aircraft $(\overline{X}_t, \overline{Y}_t)$. This position estimate is then used as the "next" guess of the aircraft's position, and "new" correction terms are then estimated to calculate the "nest" position of the aircraft as it flies along its intended course.

A detailed example will now be given which demonstrates the improved performance of Ridge Regression over LMS. Assume the aircraft is at the position given in FIG. 15, aircraft coordinates are $(-262,448,50,000)$. Assumes further that the pilot assumes his position at $(-270,148,51,500)$ which is offset by $(-7700,1500)$ from the aircraft's actual position. The problem then is to estimate the $(-7700,1500)$ offset and subtract it from $(-270,148,15,500)$ to obtain the correct position of $(-262,448,50,000)$. These calculations are repeated using the next sequence of measurements.

The error model is Equation (51) wherein 16 pairs of measurements have been made in one second. Using FIG. 15, the data matrix $H_p$ has the value, $$H_p = \begin{bmatrix} \cos(78.7°) & \sin(78.7°) \\ \cos(78.70) & \sin(79.7°) \end{bmatrix} = \begin{bmatrix} 0.1959 & 0.9805 \\ 0.1788 & 0.9839 \end{bmatrix} \quad (54)$$

Figure 9:
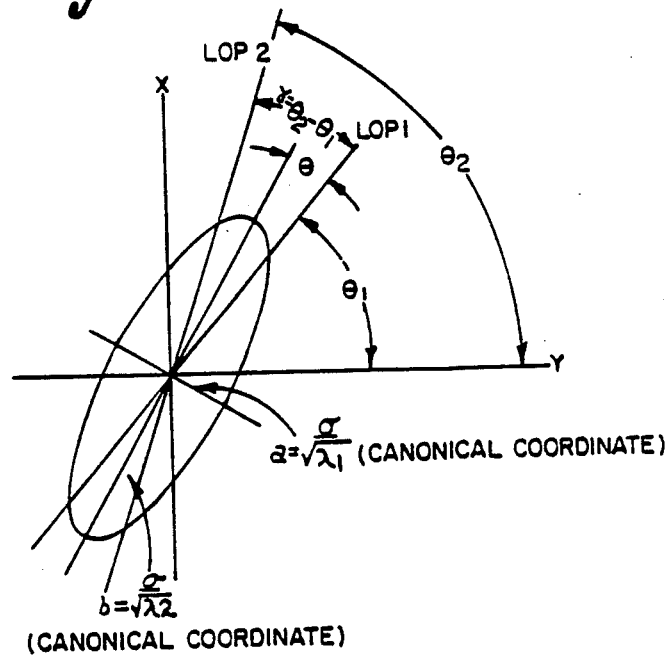
FIG. 9 is a graph of the error ellipsoid for initial position estimates.

It is at this point that the check for GDOP is made. As will be noted later, this check embodies calculating the determinant of $(H_p^T H_p)^{-1}$. That is, GDOP is present if, $$GDOP = |H_p^T H_p|^{-1} > 10 \text{ where } |H_p^T H_p|^{-1} = \frac{1}{\lambda_1 \lambda_2} \quad (55.1)$$

and are proportional to the major and minor axis of the error ellipsoid as shown in FIG. 9 (note $|H_p^T H_p|$ is the determinant of the matrix $[H_p^T H_p]$ It will be shown later that $$H_p^T H_p = \begin{bmatrix} \lambda_1 & 0 \\ 0 & \lambda_2 \end{bmatrix} \text{ where } 0^L (\lambda_1 \text{ or } \lambda_2)^L 2 \quad (55.2)$$

When there is no GDO, $|H_p^T H_p|^{-1} = 1$ because when there is GDOP, and. This means that $1/\lambda_2 >> 1$, and consequently $|H_p^T H_p|^{-1} >> 1$. As shown in FIG. 1a, the no GDOP condition results in a circular error ellipse. When GDOP is present, $1/\lambda_2 >> 1$ and the error ellipsoid becomes elongated. Using Equation (54), the system model is $$\begin{bmatrix} \delta R_1 \\ \delta R_2 \\ \delta R_1 \\ \delta R_2 \\ \vdots \\ \delta R_1 \\ \delta R_2 \end{bmatrix} = \begin{bmatrix} H_p \\ H_p \\ \vdots \\ H_p \end{bmatrix} \begin{bmatrix} \delta X \\ \delta Y \end{bmatrix} + \begin{bmatrix} e_1 \\ e_2 \\ e_3 \\ e_4 \\ \vdots \\ e_{31} \\ e_{32} \end{bmatrix} ; \quad (56)$$

$$VAR[e] = \sigma^2 \begin{bmatrix} 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \end{bmatrix}$$

and $\sigma^2 = 600$ ft
The LMS is $$\begin{bmatrix} \delta x \\ \delta y \end{bmatrix} = \beta_{LMS} = 16[H_p^T H_p]^{-1} [H_p^T H_p^T \ldots H_p^T] \begin{bmatrix} \delta R_1 \\ \delta R_2 \\ \delta R_1 \\ \delta R_2 \\ \vdots \\ \delta R_1 \\ \delta R_2 \end{bmatrix} \quad (57)$$

Figure 16A:
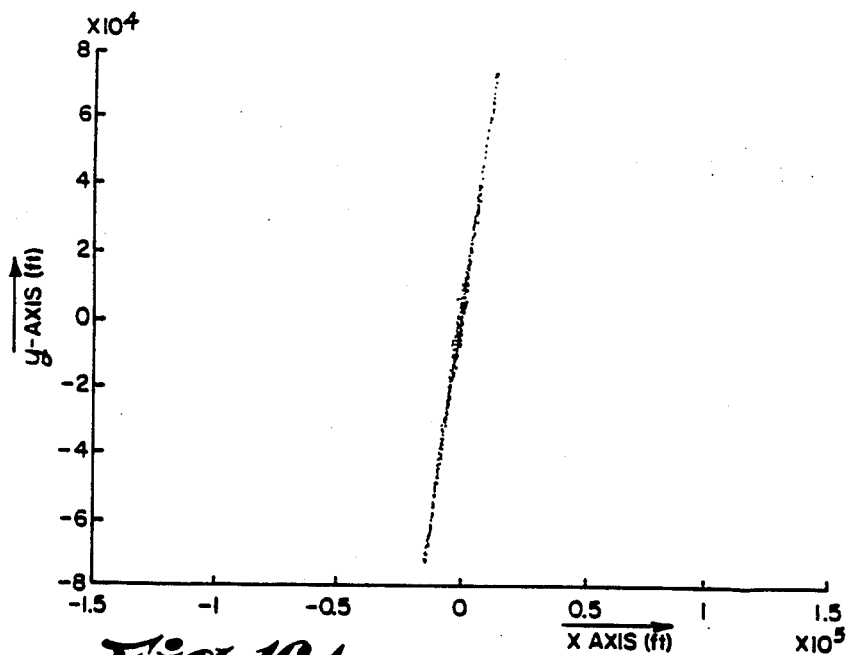
FIG. 16A is a scatter diagram of 1000 sets, each set including 16 pairs of range measurements.
Figure 16B:
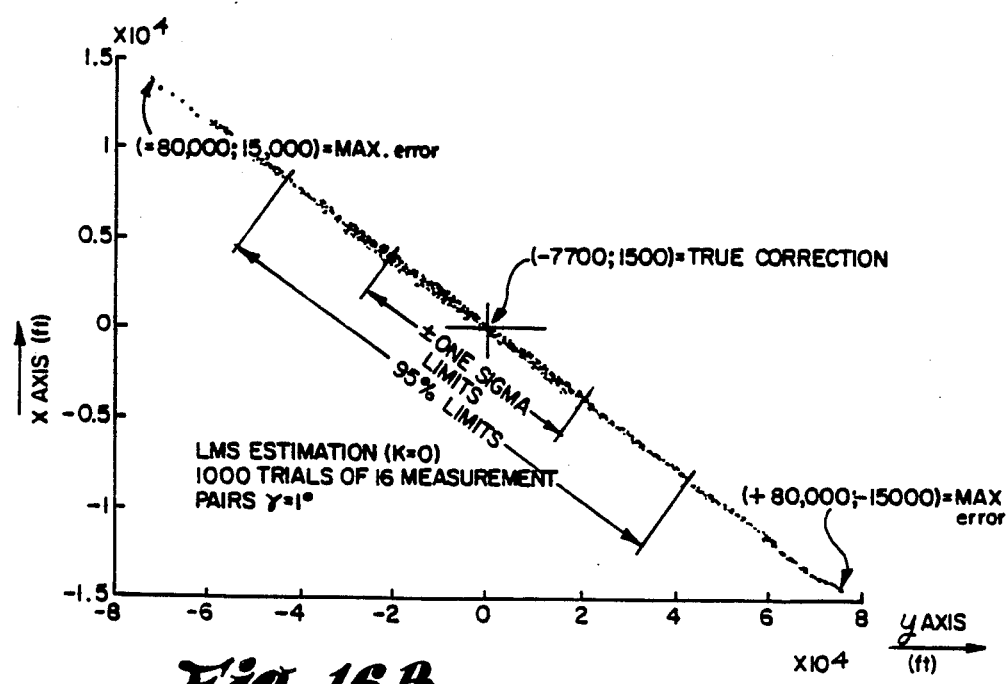
FIG. 16B is a rotated and expanded portion of FIG. 16A.

Equation 57 will be used to determine the error ellipsoid (scatter plot) of 1000 position estimate trails. The scatter plot shape also reveals whether GDOP is present. Assuming the initial position of the aircraft to be $(-7700,1500)$, 1000 sets of 16 pairs of measurements were made. The results are shown in FIG. 16A. FIG. 16B is a rotated version of FIG. 16A with expanded scales so that analysis results can be clearly indicated. The ratio of major ellipse axis to the minor ellipse axis is 115:1. The no-GDOP condition is 1:1. The results are shown in FIG. 16B. As shown, the errors due to GDOP are very large ($\pm 80,000$. $\pm 15,000$). That is, the correction estimate of the true offset ($-7700,1500$) can be as much as 10 times the magnitude of the true correction. It is the intent of the Ridge Estimates to reduce this wide variation of the estimates. Recall that the scatter plot (FIG. 16A) is what one can expect for the model assumed.

Before presenting the Ridge Regression alogrithm it is necessary to determine a method for estimating the initial aircraft position. This is an important consideration because the Ridge estimator is a biased estimator. Clearly, one should use an unbiased estimator such as the LMS estimator. But, as shown in FIG. 16, the initial estimate could, for example, be $(-87,700, 16,500)$ which because of the GDOP is much too gross an estimate, particularly for a biased estimator. Below it will be shown that the estimation bias is proportional to the error of the initial guess. An analysis below will illustrate this point.

Figure 17:
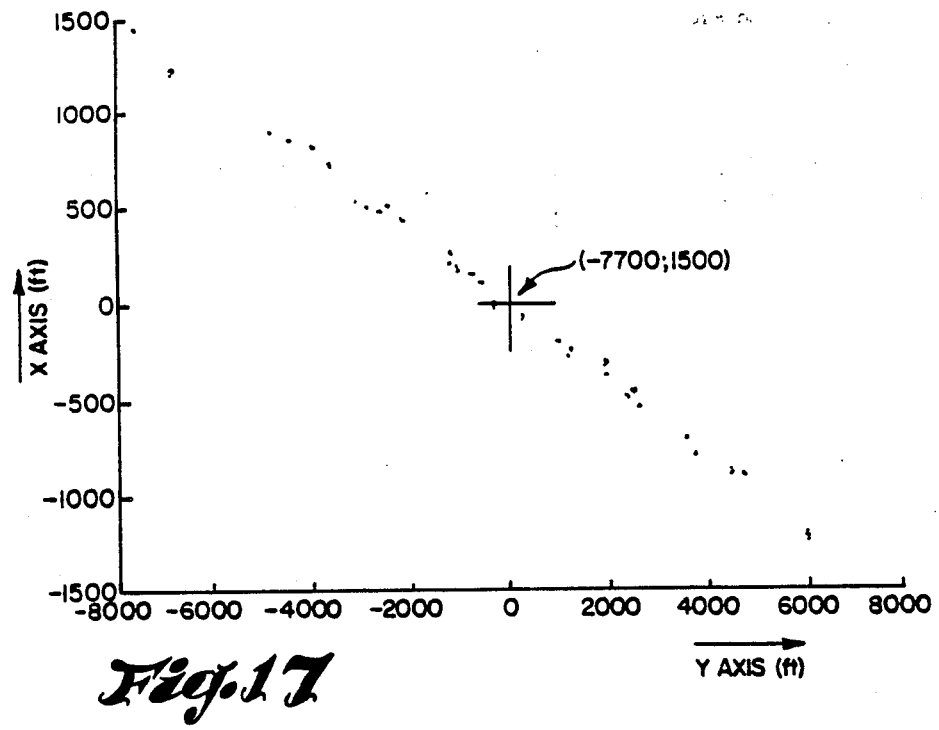
FIG. 17 is a scatter diagram of initial aircraft position where each data point represents a 30 second time average.

The idea is to average the one second estimates over a 30 second time interval, each individual estimate may have 16 pairs of measurements. A 30 second time interval is operationally permissible when the aircraft is beginning its mission. Moreover, the estimate will improve as the flight continues. Namely, the measurement process is convergent. The results of a 30 second average are shown in FIG. 17 using the LMS data of FIG. 16A. The range of the 33 sets of measurements have been reduced from ($\pm -80,000, 15000$ to $\pm 7700, \pm 1500$). The reduction is consistent with the sample variance reduction factor which is proportional to 1/30. The standard deviation reduction is $\sqrt{1/30} \simeq 1/5_5$ One of the worst case values will be used as the initial guess of the aircraft's position, namely, ($-7700, 1500$).

Since severe GDOP has been detected, the switch in FIG. 1 selects the biased estimator (Ridge estimator). The Ridge estimate is given by $$\delta\beta_R = [H_p{}^T H_p + kI]^{-1} H_p \delta R \tag{58}$$

where for this example $k=0.05$.

The analysis will proceed inserting the same data as used in the FIG. 16 experiment. The results are given in FIG. 18. As indicated, the variance has shrunk considerably. See FIG. 19 which is a "blow up" of the 1000 Ridge measurements. The price for this variance shrinkage was a bias error of (7343, −1402). That is, the average estimate of the offset (−7700, 1500) was (357,92), but the individual measurements were greatly improved because the total error is the sum of the bias component and a fluctuating component (variance). The bias error will, however, decrease with each one second measurement. After about 30 seconds, the error will be reduced to less than 1770 feet. Again, recall that the initial offset was a worst case guess.

Another method for reducing the bias of the initial value of the Ridge estimate is the Jack Knife, which is a boot strap technique. (Bradley Eforon, 1981, "The Jack Knife Estimate of Variance", Annals of Statistics, No. 9, Pgs. 586-596)

Figure 20:
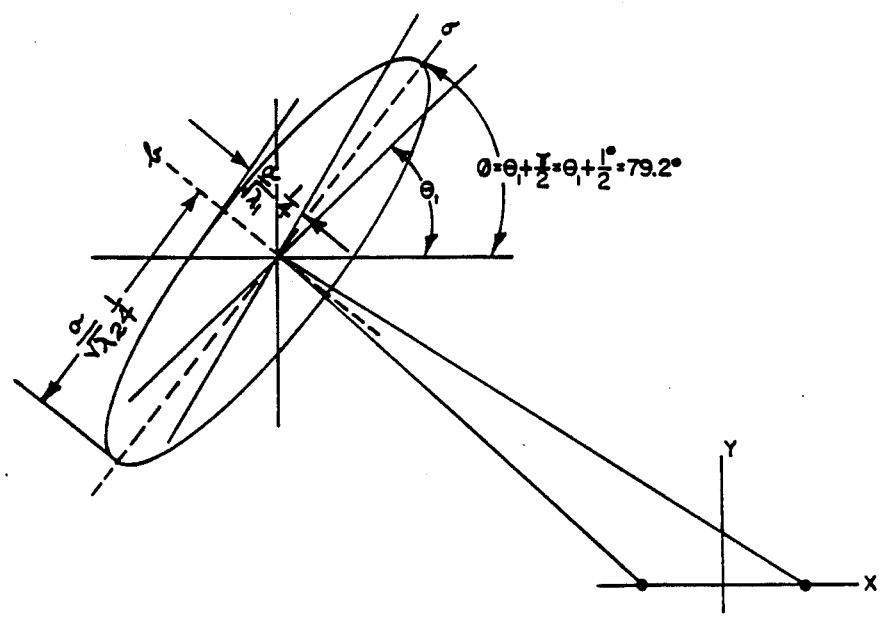
FIG. 20 is a diagram showing the error ellipsoid of the data plotted in FIG. 16A.

In the next section, the nature of the Ridge Regression variance shrinkage and its bias error will be analyzed using transforming the coordinate system to the principle axes of the error ellipsoid shown in FIG. 20.

Figure 21:
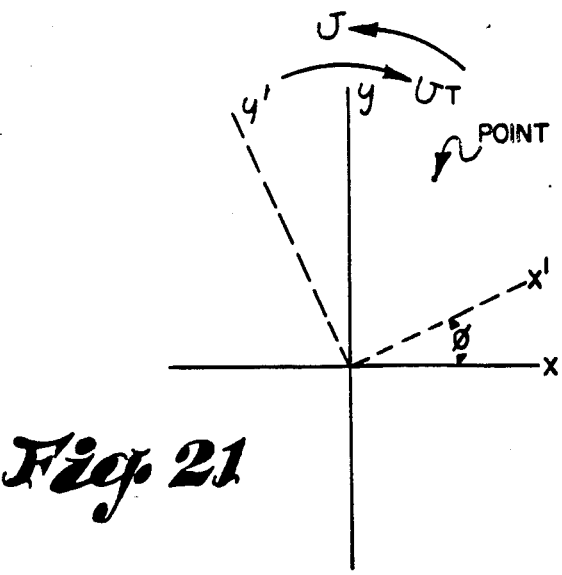
FIG. 21 is a diagram showing cononical rotation of the error eppilsoid coordinates.

The transformation which rotates the axes from the (X, Y) system to X', Y') system is given by $$U = \begin{bmatrix} \cos\phi & -\sin\phi \\ \sin\phi & \cos\phi \end{bmatrix} \tag{59}$$

where $U^T U = U^{-1} U = I$ and $\phi = \theta + 0.5°$ as shown in the figure. Thus, U causes a coordinate rotation of −degrees and $U^T$ causes a rotation of $-\phi°$. See FIG. 21. The transformation U yields the following new vectors and matrices referenced to the new coordinate system $(X^1, Y^1)$.

$$H_C = H_p U \tag{60.1}$$

$$\underline{\beta}_C = U^T \underline{\beta} \tag{60.2}$$

where $H_C$ and $\underline{\beta}_C$ are the data matrix and the estimation vector referenced in the canonical coordinate system. The important quantity is $H_p{}^T H_p$ because is expresses the magnitude of GDOP effects. Of equal important is the fact that the U transformation rotates the coordinate system such that $(X^1, Y^1)$ lie along the principal axis of the error illipsoid. For that unique condition, the off-diagonal elements of $H_p{}^T H_p$ are zero and the diagonal elements are called the eigenvalues and the columns of U are called the eigenvectors. Benefits accrued from working in the canonical coordinate system (or the eigensystem) is that (1) the effects of GDOP become obvious and (2) the calculations required to obtain the estimates can be performed almost by inspection. The $H_p{}^T H_p$ matrix in the canonical coordinates system is $$H_C{}^T H_C = U^T H_p{}^T H_p U = \begin{bmatrix} \lambda_1 & 0 \\ 0 & \lambda_2 \end{bmatrix} \tag{61}$$

where $\lambda_1$ and $\lambda_2$ are the eigenvalues given by $$\lambda_1 = 1 + \cos(\delta) = 1 + \cos(1°) = 1.99985 \tag{62}$$

$$\lambda_2 = 1 - \cos(\delta) = 1 - \cos(1°) = 0.00015$$

The inverse of $H_C{}^T H$ is a measure of the GDOP.

$$(H_C{}^T H_C)^{-1} = \begin{bmatrix} \frac{1}{\lambda_1} & 0 \\ 0 & \frac{1}{\lambda_2} \end{bmatrix} \tag{63}$$

Thus, if one of the eigenvalues is small (e.g. $\lambda_2 << 1$) the determinant of $[H_C{}^T H_C]$ is $$det\,[H_C{}^T H_C] = |H_C{}^T H_C| = 1/\lambda_1 \lambda_2 >> 1$$

That is $[H_C{}^T H_C]$ blows up or it amplifies the variance as is illustrated in FIGS. 9 and 20. Thus, if $\lambda_2$ e.g. is small, then the canonical coordinate $$\left( b = \frac{\sigma}{\sqrt{\lambda_2}} \right)$$

becomes large, generating a highly elongated ellipsoid. For example, when $\gamma = 1°$ as given in Equation (62).

$$a = \frac{\sigma}{2\sqrt{\lambda_1}} = 0.707\,\sigma/2 = 212\text{ ft for }\sigma = 600\text{ ft} \tag{64}$$

$$b = \frac{1}{2\sqrt{\lambda_2}}\sigma = 81.6\,\sigma/2 = 24,480'\text{ for }\sigma = 600\text{ ft}$$

and $b/a = 115.5$. As noted earlier, GDOP generates a highly elongated ellipse whose b axis is 115.5 times larger than the a axis.

The properties of the LMS estimates will not be viewed in terms of the canonical coordinate system. Recall that the model for the ith measurement pair is $$\delta R_i = H\beta_T + e_i \text{ where } E[e_i] = 0 \text{ and } VAR[e_i] = \sigma^2 I \tag{65}$$

and $\beta_T$ is the true offset of the assumed aircraft position from its actual position. The LMS estimate is $$\beta_{LMS} = \frac{1}{16}[H_p{}^T H_p]^{-1} H_p{}^T \delta R \tag{66}$$

for 16 pairs of measurements. The error in the estimate is $$\beta_{LMS} - \beta_T = \frac{1}{16}[H_p{}^T H_p]^{-1} H_p{}^T \delta R - \beta_T \tag{67}$$

Insert (65) into (67) yielding $$\beta_{LMS} - \beta_T = \frac{1}{16} [H_p^T H_p]^{-1} [H_p^T H_p] 16 \beta_T + \quad (68)$$

$$\frac{1}{16} [H_p^T H_p]^{-1} H_p^T e - \beta_T$$

$$\beta_{LMS} - \beta_T = \frac{1}{16} [H_p^{-1} H_p] H_p^T e \quad (69)$$

The average error of (16) is $$E[\underline{\beta}_{LMS} - \underline{\beta}_T] = 0 \text{ because } E[\underline{e}] = 0 \quad (70)$$

Therefore, the LMS estimate is unbiased. Its variance is $$VAR[\beta_{LMS} - \beta_T] = E[(\beta_{LMS} - \beta_T)(\beta_{LMS} - \beta_T)^T] = \quad (71)$$

$$\frac{1}{16} [H_p^T H_p]^{-1} 16 H_p^T (VAR[e]) H_p [H_p^T H_p]^{-1} \frac{1}{16} =$$

$$\frac{1}{16} [H_p^T H_p]^{-1} \sigma^2 = \frac{\sigma^2}{16} \begin{bmatrix} \frac{1}{\lambda_1} & 0 \\ 0 & \frac{1}{\lambda_2} \end{bmatrix}$$

for the canonical coordinate system

Thus, the variance of $\underline{\beta}_{LMS}$ is proportional to GDOP. Its effects are expressed by the error ellipsoid given in FIGS. 9 and 20.

Clearly the effects of GDOP can be limited if the eigenvalues ($\lambda_1$ and $\lambda_2$ are limited in how small a value they can assume. The Ridge regression notion is to add a small quantity k to the diagonal terms of $H_p^T H_p$. Let $$H_R^T H_R = H_p^T H_p + kI = [H_p^T H_p] + \begin{bmatrix} k & 0 \\ 0 & k \end{bmatrix} \quad (72)$$

Transform $H_R^T H_R$ to the canonical coordinate system.

$$(H_R^C)^T H_R^C = U^T H_R^T H_C U = \begin{bmatrix} \lambda_1 & 0 \\ 0 & \lambda_2 \end{bmatrix} + \begin{bmatrix} h & 0 \\ 0 & h \end{bmatrix} = \quad (73)$$

$$\begin{bmatrix} \lambda_1 + h & 0 \\ 0 & \lambda_2 + h \end{bmatrix}$$

Take the inverse of $(H_R^C)^T H_R^C$ $$[(H_R^C)^T H_R^C]^{-1} = \begin{bmatrix} \frac{1}{\lambda_1 + h} & 0 \\ 0 & \frac{1}{\lambda_2 + h} \end{bmatrix} = \quad (74)$$

$$\begin{bmatrix} 0.488 & 0 \\ 0 & 19.94 \end{bmatrix}$$

for k=0.05.
The one sigma magnitude of the error ellipsoid axes now become $$\left. \begin{array}{l} a_R = \frac{\sigma}{2\sqrt{\lambda_1 + k}} = 203 \text{ ft} \\ b_R = \frac{\sigma}{2\sqrt{\lambda_2 + k}} = 1339 \text{ ft} \end{array} \right\} \text{for } \sigma = 600 \text{ ft} \quad (75)$$

Figure 22:
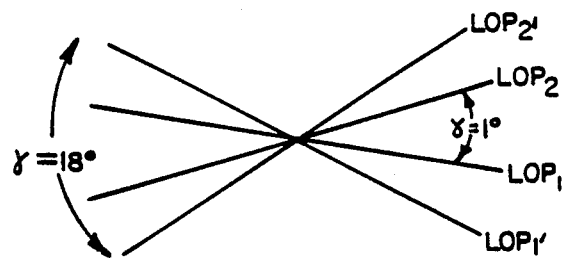
FIG. 22 is a diagram showing angles of lines of position.

Thus, the elongation of the error ellipsoid has been reduced by a factor of 24,480/1339 = 18.3:1. This reduction is reflected in FIG. 18. Note, however, that a bias has been generated; it will be discussed shortly. A geometric interpretation can be given to variance reduction caused by the addition of k to the diagonal terms of $H_p^T H_p$. Equation 74 can be rewritten as $$(H_R^C)^T H_R^C = \begin{bmatrix} 2.043 & 0 \\ 0 & 0.05015 \end{bmatrix} = \quad (76)$$

$$\begin{bmatrix} 1 + \cos \gamma + 0.05 & 0 \\ 0 & 1 - \cos \gamma + 0.05 \end{bmatrix} =$$

$$\begin{bmatrix} 1 + 1.0438 & 0 \\ 0 & 1 - 0.950 \end{bmatrix}$$

and because $0.95 = \cos \gamma$, then $\gamma = 18.2°$. Thus as shown in FIG. 22, the addition of k in $H_p^T H_p$ has the effect of limiting how small $\gamma$ can be decreased, or it is equivalent to expanding from 1° to 18.2°. The penalty is, of course, a bias error, which simply arises due to the unbalancing of $H_p^T H_p$ caused by the insertion of k. This modification is termed Ridge Regression. For the Ridge Estimator let the estimation error be, Ridge True $$\beta_{RIDGE} - \beta_{TRUE} = \left[ 16 H_p^T H_p + \begin{bmatrix} k & 0 \\ 0 & k \end{bmatrix} \right]^{-1} H_p^T \delta R - \beta_{TRUE} \quad (77)$$

$$\beta_{RIDGE} - \beta_{TRUE} =$$

$$16 \left[ 16 H_p^T H_p + \begin{bmatrix} k & 0 \\ 0 & k \end{bmatrix} \right]^{-1} H_p^T H_p \beta_{TRUE} - \beta_{TRUE} +$$

$$\left[ 16 H_p^T H_p + \begin{bmatrix} k & 0 \\ 0 & k \end{bmatrix} \right]^{-1} H_p^T e$$

where the model is $$\underline{\delta R} = H_p \beta_{True} + \underline{e}$$

Make the transformation from the (X, Y) coordinates to the ($X^1$, $Y^1$) coordinates using $H_c = H_p U$. Equation 77 becomes $$\beta'_{RIDGE} - \beta'_{TRUE} = \quad (78)$$

$$\left[ 16 H_C^T H_C + \begin{bmatrix} k & 0 \\ 0 & k \end{bmatrix} \right]^{-1} 16 H_C^T H_C \sigma^T \beta_{TRUE} - \sigma^T \beta_{TRUE} +$$

$$\left[ 16 H_C^T H_C + \begin{bmatrix} k & 0 \\ 0 & k \end{bmatrix} \right]^{-1} H_C^T \sigma^T e$$

-continued $$\beta'_{RIDGE} - \beta'_{TRUE} = \quad (79)$$

$$\begin{bmatrix} \frac{1}{16\lambda_1 + k} & 0 \\ 0 & \frac{1}{16\lambda_2 + k} \end{bmatrix} \begin{bmatrix} 16\lambda_1 & 0 \\ 0 & 16\lambda_2 \end{bmatrix} \sigma^T \beta_{TRUE} -$$

$$\sigma^T \beta_{TRUE} + \begin{bmatrix} \frac{1}{16\lambda_1 + k} & 0 \\ 0 & \frac{1}{16\lambda_2 + k} \end{bmatrix} H_C^T \sigma^T e =$$

$$\begin{bmatrix} \frac{-k}{16\lambda_1 + k} & 0 \\ 0 & \frac{-k}{16\lambda_2 + k} \end{bmatrix} \sigma^T \beta_{TRUE} +$$

$$\begin{bmatrix} \frac{1}{16\lambda_1 + k} & 0 \\ 0 & \frac{1}{16\lambda_2 + k} \end{bmatrix} H_C^T \sigma^T e$$

where $$H_C^T H_C = \begin{bmatrix} \lambda_1 & 0 \\ 0 & \lambda_2 \end{bmatrix}$$

The bias error in the canonical coordinates is $$\beta'_{ias} = E[\beta'_{RIDGE} - \beta'_{TRUE}] = \quad (80)$$

$$\begin{bmatrix} \frac{-k}{16\lambda_1 + k} & 0 \\ 0 & \frac{-k}{16\lambda_2 + k} \end{bmatrix} \sigma^T \beta_{TRUE} + 0$$

where $E[e] = 0$

Insert (59) into (80) using $k=0.05$, $\beta_{True}=[-7700, 1500]$ $$\beta_{IAS} = \begin{bmatrix} \frac{-0.05}{32.04} & 0 \\ 0 & \frac{-0.05}{0.0524} \end{bmatrix} \begin{bmatrix} 0.187 & 0.382 \\ -0.582 & 0.187 \end{bmatrix} \begin{bmatrix} -7700 \\ 1500 \end{bmatrix} =$$

$$\begin{bmatrix} 0 \\ 7844 \end{bmatrix}$$

Thus, $$\beta'_{IAS} = \begin{bmatrix} 0 \\ 7483 \end{bmatrix}$$

in the canonical coordinate system.

In the original (X, Y) system the bias error is $$\beta_{IAS} \begin{bmatrix} \cos\phi & -\sin\phi \\ \sin\phi & \cos\phi \end{bmatrix} \begin{bmatrix} 0 \\ 7483 \end{bmatrix} \quad (81)$$

$$\beta_{IAS} = \begin{bmatrix} 0.1874 & -0.382 \\ 0.982 & 0.1874 \end{bmatrix} \begin{bmatrix} 0 \\ 7483 \end{bmatrix} = \begin{bmatrix} -7348 \\ 1402 \end{bmatrix} \quad (82)$$

Figure 18:
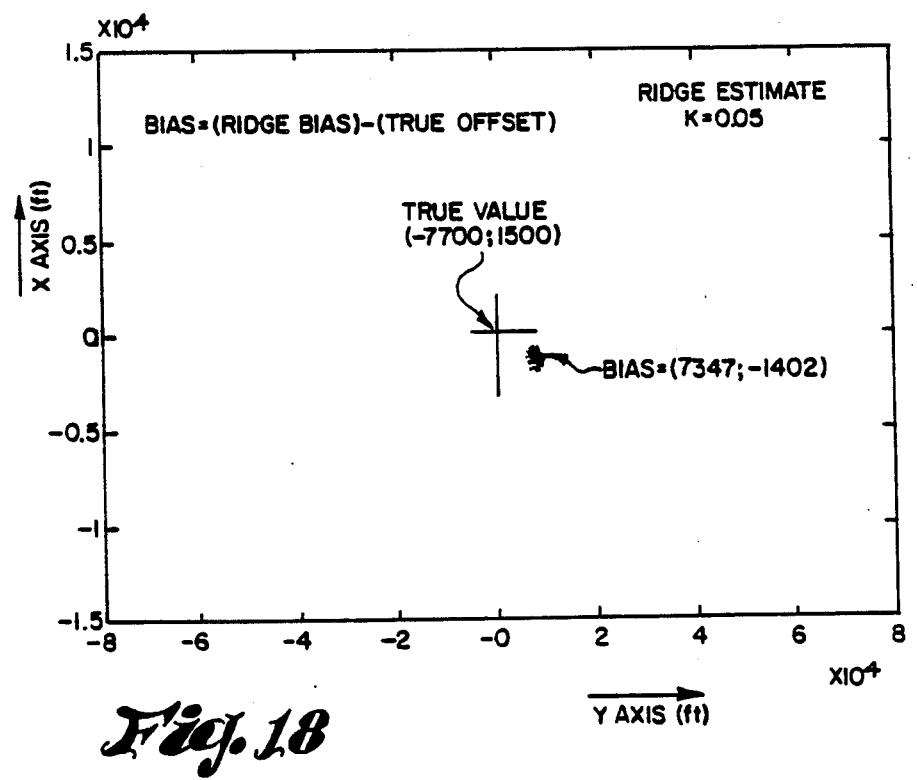
FIG. 18 is a scatter diagram of the 1000 Ridge estimates showing the bias error at the center of the estimates with respect to the true value.
Figure 19:
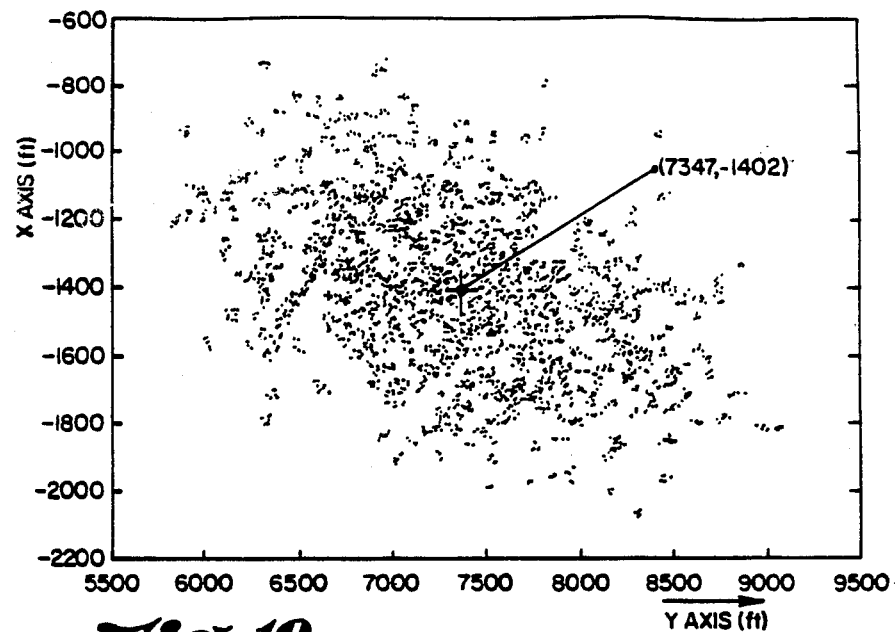
FIG. 19 is a portion of FIG. 18 expanded.

The value in (82) is also the one obtained in the computer simulation plotted in FIGS. 18 and 19.

The variance of the Ridge Regression Estimator is given by (83) in the canonical coordinate system where $\beta_T = \beta_{True}$.

$$VAR(\beta_{RIDGE} - \beta_T) = E[(\beta_{RIDGE} - \beta_T)(\beta_{RIDGE} - \beta_T)^T] \quad (83)$$

$$= [H_C^T H_C + Ih]^{-1} H_C^T H_C [H_C^T H_C + Ih]^{-1} \sigma^2 \text{ using } H_C^T H =$$

$$\begin{bmatrix} \lambda_1 & 0 \\ 0 & \lambda_2 \end{bmatrix}, \text{ EQUATION (83) BECOMES}$$

$$VAR(\beta_{RIDGE} - \beta_T) = \quad (84)$$

$$\begin{bmatrix} \frac{1}{\lambda_1 + h} & 0 \\ 0 & \frac{1}{\lambda_2 + h} \end{bmatrix} \begin{bmatrix} \lambda_1 & 0 \\ 0 & \lambda_2 \end{bmatrix}$$

$$\begin{bmatrix} \frac{1}{\lambda_1 + h} & 0 \\ 0 & \frac{1}{\lambda_2 + h} \end{bmatrix} =$$

$$\begin{bmatrix} \frac{\lambda_1}{(\lambda_1 + h)^2} & 0 \\ 0 & \frac{\lambda_2}{(\lambda_2 + h)^2} \end{bmatrix} \sigma^2 =$$

$$\begin{bmatrix} \frac{1.99985}{(2.049)^2} & 0 \\ 0 & \frac{0.00015}{(0.05015)^2} \end{bmatrix} (600)^2 =$$

$$\begin{bmatrix} (0.6899)^2 & 0 \\ 0 & (0.2442)^2 \end{bmatrix} (600)^2$$

where the eigenvalues $\lambda_1$ and $\lambda_2$ are given Equation 62.
The standard deviation is $$\sqrt{VAR(\beta_{RIDGE} - \beta_T)} = \begin{bmatrix} 414 & 0 \\ 0 & 146 \end{bmatrix} \quad (85)$$

$$\sqrt{VAR(\delta X)} = 414 \text{ and } \sqrt{VAR(\delta Y)} = 146$$

or $VAR(\delta X) = 414$ and $VAR(\delta Y) = 146$

The calculated standard deviations given by (85) are consistent with the 1000 computer derived samples plotted in FIG. 19.

The invention claimed is:

1. Apparatus for determining the position and velocity of a moving platform comprising:
   a radio navigation aid having at least three portions, two of which are distant from said platform and having a known position for providing to said platform a plurality of samples indicative of the position of said platform at respective times,
   a position estimator for receiving said plurality of samples for generating an estimate of position and velocity both with an unbiased estimator wherein the mean square error of the estimate is the variance and with a biased estimator and selecting said estimate of position and velocity from said biased estimator at times said geometry of said moving platform is substantially co-linear with said two distant portions of said radio navigation aid.

2. The apparatus of claim 1 wherein said biased estimator is a Ridge estimator.

3. The apparatus of claim 1 wherein said position estimator includes a switch coupled to the outputs of said unbiased estimator and said estimator biased for coupling one of said outputs to an output terminal of said position estimator in response to a control signal.

4. The apparatus of claim 3 wherein said position estimator further includes a geometric collinear estimator for determining the presence of collinearity having an output coupled to the control input of said switch.

5. The apparatus of claim 4 wherein said geometric collinear estimator estimates the angle between two lines of position and for providing an output signal to the control input of said switch at times said angle is less than a first predetermined value and at times said angle is greater than a second predetermined value.

6. The apparatus of claim 1 wherein said position estimator includes a means for calculating the Ridge parameter K having a input coupled to the output of an unbiased estimator and wherein the output of said means for calculating is coupled to an input of said bias estimator.

7. The apparatus of claim 1 further including an adder coupled to the output of said position estimator having a second input adapted for coupling to position commands, the output of said adder coupled to the input of an autopilot, said autopilot adapted for coupling to said moving platform to direct said moving platform along a disired flight path.

8. Apparatus for determining the position and velocity of a moving platform in cooperation with at least two distant radio navigation aids spaced apart in distance by a predetermined amount comprising:
   means for receiving a plurality of samples from said radio navigation aids indicative of the position of said platform at respective times, means for determining the lines of position to each navigation aid and the angle of intersection of said lines of position at said platform,
   means for generating an estimate of position and velocity from said plurality of samples with an unbiased estimator wherein the mean square error of the estimate is the variance,
   means for generating an estimate of position and velocity with a biased estimator, and
   means for selecting said estimate of position and velocity from said biased estimator at times said angle of intersection of said lines of position are less than a first predetermined value or greater than a second predetermined value and for selecting said estimate of position and velocity from said unbiased estimator at other times.

9. The apparatus of claim 8 further including means for calculating a Ridge parameter K as a function of the output of said unbiased estimator, said Ridge parameter K coupled to an input of said biased estimator.

10. The apparatus of claim 8 wherein said biased estimator is a Ridge estimator.

11. A method for determining the position and velocity of a moving platform in cooperation with at least two distant radio navigation aids spaced apart in distance by a predetermined amount comprising the steps of:
   receiving a plurality of samples from said radio navigation aids indicative of the position of said platform at respective times, determining the lines of position to each navigation aid and the angle of intersection of said lines of position at said platform,
   generating an estimate of position and velocity from said plurality of samples with an unbiased estimator wherein the mean square error of the estimate is the variance,
   generating an estimate of position and velocity with a biased estimator, and
   selecting said estimate of position and velocity from siad biased estimator at times said angle of intersection of said lines of position are less than a first predetermined value or greater than a second predetermined value and for selecting said estimate of position and velocity from said unbiased estimator at other times.

12. The method of claim 11 including calculating a Ridge parameter K as a function of the output of said unbiased estimator, said Ridge parameter K coupled to an input of said biased estimator.

13. Apparatus for determining the position and velocity of a moving platform in a position-fix navigation system having known first and second transmitter locations at times the geometry of said transmitter locations with respect to the estimated position of the receiver on a moving platform is nearly collinear comprising:
   first means for receiving and storing a plurality of n samples indicative of range each spaced apart by an intersample time interval $\Delta T_S$ and occurring within time interval $\Delta T_M$ from each of said first and second transmitters having a known distance therebetween,
   second means for determining the initial position $X_O$, $Y_O$ of said platform from said plurality of n samples from each of said first and second transmitters where $$X_O = \frac{R_{01}^2 - R_{02}^2}{4X_{CI}} \quad (1)$$

$$Y_O = \sqrt{R_{01}^2 - \left(\frac{R_{01}^2 - R_{02}^2}{4X_{CI}} - X_{CI}\right)^2} \quad (2)$$

where $\overline{R}_{01}$ is the distance to the first transmitter at time $T_1$, $\overline{R}_{02}$ is the distance to the second transmitter at time $T_2$,
and $X_{CI}$ is the position of said first transmitter,
third means for determining $$\frac{\partial R_{11}}{\partial x}, \frac{\partial R_{12}}{\partial x}, \frac{\partial R_{11}}{\partial y}, \text{ and } \frac{\partial R_{12}}{\partial y}$$

where $$\frac{\partial R_{11}}{\partial x} = \frac{X_O - X_{c1}}{R_{11}} = \cos\theta_1$$

$$\frac{\partial R_{12}}{\partial x} = \frac{X_O - X_{c2}}{R_{12}} = \cos\theta_2$$

$$\frac{\partial R_1}{\partial Y} = \frac{Y_O - Y_1}{R_{11}^1} = \sin\theta_1$$

$$\frac{\partial R_{12}}{\partial Y} = \frac{Y_O - Y_2}{R_{12}} = \sin\theta_2$$

fourth means for determining $H^T H$ where $$H^T H = \begin{bmatrix} A \cdot n & B \cdot n & A \cdot \Delta T_s \sum_{i=1}^{n-1} i & B \cdot \Delta T_s \sum_{i=1}^{n-1} i \\ B \cdot n & C \cdot n & B \cdot \Delta T_s \sum_{i=1}^{n-1} i & C \cdot \Delta T_s \sum_{i=1}^{n-1} i \\ A \cdot \Delta T_s \sum_{i=1}^{n-1} i & B \cdot \Delta T_s \sum_{i=1}^{n-1} i & A \cdot \Delta T_s^2 \sum_{i=1}^{n-1} i^2 & B \cdot \Delta T_s \sum_{i=1}^{n-1} i^2 \\ B \cdot \Delta T_s \sum_{i=1}^{n-1} i & C \cdot \Delta T_s \sum_{i=1}^{n-1} i & B \cdot \Delta T_s^2 \sum_{i=1}^{n-1} i^2 & C \cdot \Delta T_s^2 \sum_{i=1}^{n-1} i^2 \end{bmatrix}$$

where
 $A = \cos^2\theta_1 + \cos^2\theta_2$
 $B = \cos\theta_1 \sin\theta_1 + \cos\theta_2 \sin\theta_2$
 $C = \sin^2\theta_1 + \sin^2\theta_2$
fifth means for determining $H^T H^{-1}$,
sixth means for determining $H^T \delta R$ $$H^T \delta R = \begin{bmatrix} \cos\theta_1 \sum_{i=1}^{n} \delta R_{i1} + \cos\theta_2 \sum_{i=1}^{n} \delta R_{i2} \\ \sin\theta_1 \sum_{i=1}^{n} \delta R_{i1} + \sin\theta_2 \sum_{i=1}^{n} \delta R_{i2} \\ \cos\theta_1 \Delta T_s \sum_{i=2}^{n} \delta R_{i1} + \cos\theta_2 \Delta T_s \sum_{i=2}^{n} \delta R_{i2} \\ \sin\theta_1 \Delta T_s \sum_{i=2}^{n} \delta R_{i1} + \sin\theta_2 \Delta T_s \sum_{i=2}^{n} \delta R_{i2} \end{bmatrix}$$

seventh means for determining $\hat{\beta}_{OLS}$ where $\hat{\beta}_{OLS} = (H^T H)^{-1} H^T \delta R$,
eighth means for determining $\hat{\beta}_{OLS}^T$,
ninth means for selecting $\hat{K}_{OP}$ where $$K_{OP} = \frac{PS^2}{\beta_{OLS}^T \beta_{OLS}}$$

where P is the number of variables and $S^2$ is the sample standard deviation where $$S^2 = \frac{1}{n-P} \sum_{i=1}^{32} (\delta R_i^2),$$

and
tenth means for determining $\hat{\beta}_R$ where $\hat{\beta}_R = (H^T H + K_{OP} I)^{-1} H^T \delta R$ to provide $[\delta X, \delta Y, V_x, V_y]$.

* * * * *